(12) United States Patent
Miwa et al.

(10) Patent No.: US 8,046,632 B2
(45) Date of Patent: Oct. 25, 2011

(54) BACKUP MANAGEMENT METHOD BASED ON MODE OF FAILURE

(75) Inventors: Kyoko Miwa, Kawasaki (JP); Nobuhiro Maki, Yokohama (JP); Masayasu Asano, Yokohama (JP); Hironori Emaru, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 147 days.

(21) Appl. No.: 12/622,940

(22) Filed: Nov. 20, 2009

(65) Prior Publication Data

US 2011/0041004 A1    Feb. 17, 2011

(30) Foreign Application Priority Data

Aug. 12, 2009   (JP) .................................. 2009-186961

(51) Int. Cl.
*G06F 11/07* (2006.01)

(52) U.S. Cl. ......... 714/6.3; 707/634; 707/654; 707/659; 714/E11.125

(58) Field of Classification Search .................... 714/6.3, 714/E11.125; 707/655–660, 634, 654
See application file for complete search history.

(56) References Cited

U.S. PATENT DOCUMENTS

| 6,948,089 | B2 | 9/2005 | Fujibayashi |
| 2002/0010665 | A1* | 1/2002 | Lefebvre et al. ................ 705/31 |
| 2004/0260726 | A1* | 12/2004 | Hrle et al. ................... 707/104.1 |
| 2005/0160305 | A1* | 7/2005 | Soejima ............................ 714/2 |
| 2007/0115738 | A1* | 5/2007 | Emaru et al. .................. 365/203 |
| 2009/0313311 | A1* | 12/2009 | Hoffmann et al. ............ 707/204 |
| 2010/0162238 | A1* | 6/2010 | Warfield ........................... 718/1 |

FOREIGN PATENT DOCUMENTS

JP        2003-242011 A       8/2003
* cited by examiner

*Primary Examiner* — Scott Baderman
*Assistant Examiner* — Chae Ko
(74) *Attorney, Agent, or Firm* — Foley & Lardner LLP

(57) ABSTRACT

A storage management program is provided with a function of determining a suspension/continuation of a remote backup based on an operation-at-failure management table, and accomplishes the suspension/continuation of the backup based on the application in which a failure has occurred and the mode of this failure. The storage management program is also provided with a function of computing a change in the quantity of data from the last backup before the occurrence of the failure until the first backup after the occurrence of the failure, and determining the suspension/continuation of the backup, enabling to suspend/continue the backup in line with the operating status of the application.

14 Claims, 27 Drawing Sheets

2109

| VOLUME ID (21091) | APPLICATION ID (21092) | FAILURE ID (21093) | OPERATION AT TIME OF FAILURE (21094) | PRIORITY (21095) |
|---|---|---|---|---|
| VOL01 | AP01 | * | SUSPEND | 100 |
| VOL02 | AP02 | F01 (VIRUS DETECTED) | CONTINUE | 30 |
|  |  | F02 (VIRUS INFECTION) | SUSPEND | 100 |
|  | AP03 | F03 (TABLE DESTROYED) | CONTINUE | 40 |
|  |  | F04 (STATICIZATION FAILED) | SUSPEND | 80 |
| ... | ... | ... | ... | ... |

| STORAGE ID (21011) | IP ADDRESS (21012) |
|---|---|
| STORAGE 1 | 192.168.0.2 |
| STORAGE 2 | 192.168.0.3 |
| ... | ... |

| STORAGE ID (21031) | VOLUME ID (21032) | CAPACITY (21033) | UTILIZATION FLAG (21034) |
|---|---|---|---|
| STORAGE 1 | VOL01 | 10G | IN USE |
| STORAGE 1 | VOL02 | 20G | IN USE |
| ... | ... | ... | ... |
| STORAGE 2 | VOL01 | 10G | IN USE |
| STORAGE 2 | VOL02 | 20G | UNUSED |
| ... | ... | ... | ... |

| APPLICATION ID | IP ADDRESS | STORAGE ID | VOLUME ID |
|---|---|---|---|
| AP01 | 192.168.1.2 | STORAGE 1 | VOL01 |
| AP02 | 192.168.1.3 | STORAGE 1 | VOL02 |
| AP03 | 192.168.1.3 | STORAGE 1 | VOL02 |
| ... | ... | ... | ... |

| APPLICATION ID | BACKUP TYPE | POLICY ID | BACKUP STATUS |
|---|---|---|---|
| AP01 | LOCAL | LP01 | VALID |
|  | REMOTE | RP01 | VALID |
| AP02 | LOCAL | LP02 | VALID |
|  | REMOTE | RP02 | VALID |
| AP03 | LOCAL | LP02 | VALID |
|  | REMOTE | RP02 | IVALID |
| ... | ... | ... | ... |

| LOCAL BACKUP POLICY ID (21051) | PAIR ID (21052) | SCHEDULE (21053) |
|---|---|---|
| LP01 | PAIR01 | DAILY AT 00:00 |
| LP02 | PAIR02 | DAILY AT 00:00 |
| ... | ... | ... |

| REMOTE BACKUP POLICY ID (21061) | PAIR ID (21062) | SCHEDULE (21063) |
|---|---|---|
| RP01 | PAIR01 | EVERY SUNDAY AT 00:00 |
| RP02 | PAIR02 | EVERY SUNDAY AT 00:00 |
| ... | ... | ... |

FIG. 17

LOCAL BACKUP SETTING — 5000

5001
SPECIFY APPLICATION ID: -AP01 (DB MANAGER)

VOLUME BEING USED:

| STORAGE ID | VOLUME ID |
|---|---|
| 1 | VOL01 |

SPECIFY BACKUP-DESTINATION VOLUME — 5003 / 5002

| | VOLUME ID | REMOTE BACKUP YES/NO | REMOTE BACKUP SCHEDULE |
|---|---|---|---|
| ☑ | VOL11 | YES | EVERY SUNDAY AT 00:00 |
| ☐ | VOL15 | NO | — |
| ☐ | VOL16 | YES | DAY FIRST AT 00:00 EVERY MONTH |
| ☐ | ... | ... | ... |

BACKUP SCHEDULE — 5004

⊙ DAILY  [-00] [-00]  (HH:mm)

○ WEEKLY  [-MONTH] [-00] [-00]  ((DAY OF WEEK): HH:mm)

○ MONTHLY  [-1] [-00] [-00]  ((DATE): HH:mm)

[ADD]   [DELETE]

- DAILY AT 00:00

REMOTE BACKUP SETTING

BACKUP SOURCE — 6001
- STORAGE ID: -STORAGE 1
- VOLUME ID: -VOL12

BACKUP DESTINATION — 6002
- STORAGE ID: -STORAGE 2
- VOLUME ID: -VOL02

BACKUP SCHEDULE — 6003
- ○ DAILY  -00  -00  (HH:mm)
- ◉ WEEKLY  -DAY  -00  -00  ((DAY OF WEEK): HH:mm)
- ○ MONTHLY  -1  -00  -00  ((DATE): HH:mm)

[ADD]   [DELETE]

- EVERY SUNDAY AT 00:00

OPERATION-AT-FAILURE REGISTRATION — 7000

SPECIFY APPLICATION ID

-AP03 (DB MANAGER) ▽ — 7001

SPECIFY OPERATION AT TIME OF FAILURE — 7002

| ☐ | FAILURE ID | OPERATION AT TIME OF FAILURE |
|---|---|---|
| ☐ | F01 (VIRUS DETECTED) | ○ CONTINUE  ○ SUSPEND |
| ☐ | F02 (VIRUS INFECTION) | ○ CONTINUE  ○ SUSPEND |
| ☑ | F03 (TABLE DESTROYED) | ⊙ CONTINUE  ○ SUSPEND |
| ☑ | F03 (STATICIZATION FAILED) | ○ CONTINUE  ⊙ SUSPEND |
| ☐ | ... | ... |

7003

NEXT

FIG. 26

| VOLUME ID | APPLICATION ID | FAILURE ID | CONDITION (DATA QUANTITY CHANGE) | OPERATION AT TIME OF FAILURE | PRIORITY |
|---|---|---|---|---|---|
| VOL01 | AP01 | * | * | SUSPEND | 100 |
| VOL02 | AP02 | F01 (VIRUS DETECTED) | * | CONTINUE | 30 |
| | | F02 (VIRUS INFECTION) | * | SUSPEND | 100 |
| | AP03 | F03 (TABLE A DESTROYED) | LESS THAN 300 K-BYTES | SUSPEND | 50 |
| | | | MORE THAN 300 K-BYTES | CONTINUE | |
| | | F04 (TABLE B DESTROYED) | LESS THAN 1000 K-BYTES | SUSPEND | 40 |
| | | | MORE THAN 1000 K-BYTES | CONTINUE | |
| | | F04 (STATICIZATION FAILED) | * | SUSPEND | 80 |
| ... | ... | ... | ... | ... | ... |

FIG. 29

| VOLUME ID | APPLICATION ID | FAILURE ID | OPERATION AT TIME OF FAILURE | PRIORITY |
|---|---|---|---|---|
| VOL01 | AP01 | * | SUSPEND | 100 |
| VOL02 | AP02 | F01 (VIRUS DETECTED) | CONTINUE | 30 |
| | | F02 (VIRUS INFECTION) | SUSPEND | 100 |
| | AP03 | F03 (TABLE DESTROYED) | CONTINUE | 40 |
| | | F04 (STATICIZATION FAILED) | TEMPORARY VOLUME BACKUP | 80 |
| ... | ... | ... | ... | ... |

BACKUP MANAGEMENT METHOD BASED ON MODE OF FAILURE

CROSS-REFERENCE TO PRIOR APPLICATION

This application relates to and claims the benefit of priority from Japanese Patent Application number 2009-186961, filed on Aug. 12, 2009 the entire disclosure of which is incorporated herein by reference.

BACKGROUND

The present invention generally relates to a backup method for use when a logical failure occurs.

In a computer system, a "backup" for replicating and storing data is generally implemented in preparation for a logical failure, which is the destruction of data due to user error or a computer virus. Also, when a failure occurs in original data, backup data is used to carry out a "restore" to recover the data. A backup is normally carried out after staticizing the application that is using the data in order to assure data consistency.

Japanese Patent Application Laid-open No. 2003-242011 discloses technology related to a remote backup for backing up data on a remote storage. A remote backup makes it possible to prevent data loss because even when a failure occurs in data that is stored in one of storages, the data still remains in the other one of the storages.

SUMMARY

To improve data availability, there are cases in which the backup data of a certain data is further backed up. For example, the certain data is backed up on a local storage, and the backup data thereof is also backed up on a remote storage. Furthermore, a backup of the original data will be called a primary backup, and a backup of the backup data created using the primary backup will be called a secondary backup.

In an environment like this, there are cases in which the primary backup and the secondary backup are respectively managed by different users. For example, since staticizing the application must be carried out by taking into account the operating status of the application, the user that manages the host computer running the business application will manage the primary backup. Alternately, the secondary backup is managed by the user that manages the storage system. Additionally, in a case where a storage being managed by an external organization is used as the remote storage, there may be instances when there are restrictions with respect to the number of volumes capable of storing the backup data created in accordance with the secondary backup.

In the above-described environment, since data could be destroyed when a logical failure occurs in an application that is using the data, a determination must be made as to whether to suspend or continue a secondary backup in accordance with the application and the mode of the failure therein. For example, in the case of a serious failure in which all the data is destroyed as a result of a virus infection, the secondary backup may be suspended in order to save the backup data created prior to the failure. Alternately, in the case of a minor failure in which non-business-related data, such as data being used in a test application, has been destroyed, the secondary backup may be continued. Also, in a case where it has been determined that the application has been running at full capacity from the point in time at which the last secondary backup prior to the failure was carried out until the first secondary backup subsequent to the failure is to be carried out and a large quantity of data has been updated, the backup may be continued giving priority to backing up the updated data.

However, in the prior art, when a failure occurred in the above environment, a backup could only be suspended or continued regardless of the application and failure mode therein, and the application operating status. For this reason, there were cases in which a backup was suspended despite the fact that the failure was minor, and other cases in which the backup was continued despite the fact that the failure was serious.

An object of the present invention is to provide a method for determining whether to suspend or continue a backup in accordance with the application and the mode of the failure therein.

Another object of the present invention is to provide a method for determining whether to suspend or continue a backup in accordance with the operating status of the application from the time of the last backup prior to the failure occurring until the time of the first backup subsequent to the failure having occurred.

The present invention makes it possible to suspend or continue a backup based on the application in which a failure has occurred and the mode of this failure by providing a storage management program with a function for making a determination as to whether to suspend or continue a remote backup based on information denoting the operation-at-failure management process.

Further, in the present invention, a data quantity change computation program is also provided in the storage management program, and when the storage management program receives a notification that a failure has occurred, this storage management program computes the quantity of data that has changed from the time that the last remote backup prior to the occurrence of the failure was carried out until the time when the first remote backup subsequent to the occurrence of the failure is to be carried out, and makes a determination as to whether to suspend or continue the remote backup based on the result of this computation.

According to the present invention, it is possible to determine whether to suspend or continue a backup in line with the application in which a failure has occurred and the mode of this failure.

Further, according to the present invention, it is also possible to determine whether to suspend or continue a backup in line with the degree of the impact that will result when the backup is suspended.

BRIEF DESCRIPTION OF THE DRAWINGS

FIG. 6 is a diagram showing the structure of a storage management table of the first example;

FIG. 7 is a diagram showing the structure of a volume management table of the first example;

FIG. 8 is a diagram showing the structure of an application management table of the first example;

FIG. 9 is a diagram showing the structure of a backup management table of the first example;

FIG. 10 is a diagram showing the structure of a local backup policy management table of the first example;

FIG. 11 is a diagram showing the structure of a remote backup policy management table of the first example;

FIG. 17 is a diagram showing a local backup setting screen of the first example;

FIG. 18 is a diagram showing a remote backup setting screen of the first example;

FIG. 19 is a diagram showing an operation-at-failure setting screen of the first example;

FIG. 26 is a diagram showing the structure of an operation-at-failure management table of the second example;

FIG. 29 is a diagram showing the structure of an operation-at-failure management table of a third example;

DETAILED DESCRIPTION OF THE EMBODIMENT

The present invention will be explained below using the drawings.

Example 1

Figure 1:
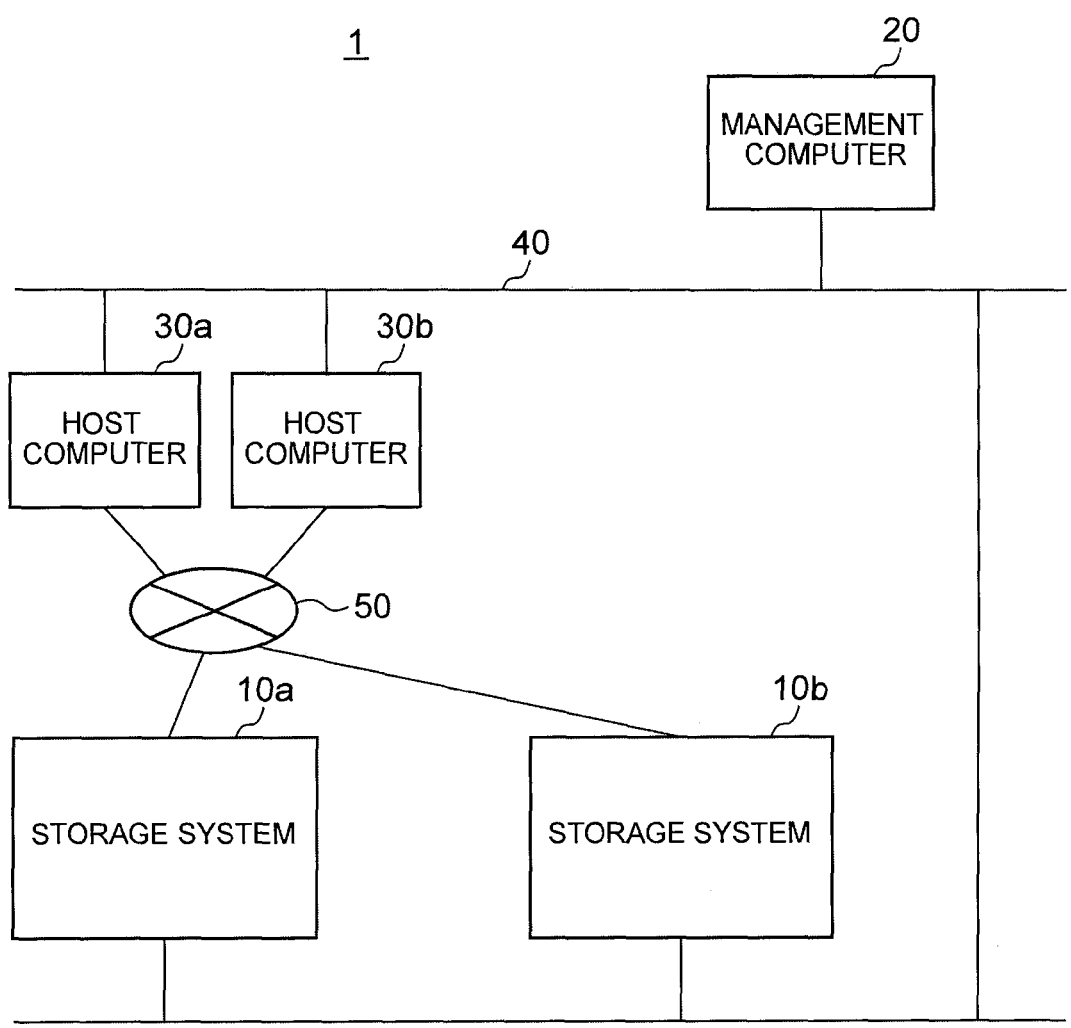
FIG. 1 is a diagram showing the configuration of a computer system of a first example.

FIG. 1 is a diagram showing an example of the configuration of a computer system 1 of the first example. As shown in this drawing, the computer system 1 comprises a plurality of host computers 30a, 30b and a plurality of storage systems 10a, 10b, which are interconnected via a storage network 50. The computer system 1 also comprises a management computer 20, which is connected to each of the plurality of storage systems 10a, 10b via a management network 40. The computer system 1, for example, may be a business system of a banking institution, or a seating reservation system of an airline company.

The storage network 50 is a network system that is used primarily for communications based on I/O requests between the host computers 30a, 30b and the storage systems 10a, 10b. The storage network 50 is also used in remote backup-based communication between the storage systems 10a, 10b. The storage network 50, for example, is either a LAN or a SAN (Storage Area Network), and typically comprises a network switch or a hub. In this embodiment, it is supposed that the storage network 50 is configured from a Fiber Channel protocol-based SAN (FC-SAN).

The management network 40 is used for communications when the management computer 20 manages the host computers 30a, 30b and the storage systems 10a, 10b. In this embodiment, it is supposed that the management network 40 is configured from an IP protocol-based LAN. However, this does not mean that the storage network 50 and the management network 40 are configured so as to always be physically separate. For example, in a case where the storage network 50 is configured from an IP protocol-based network, the two may be formed on a single network system.

Figure 2:
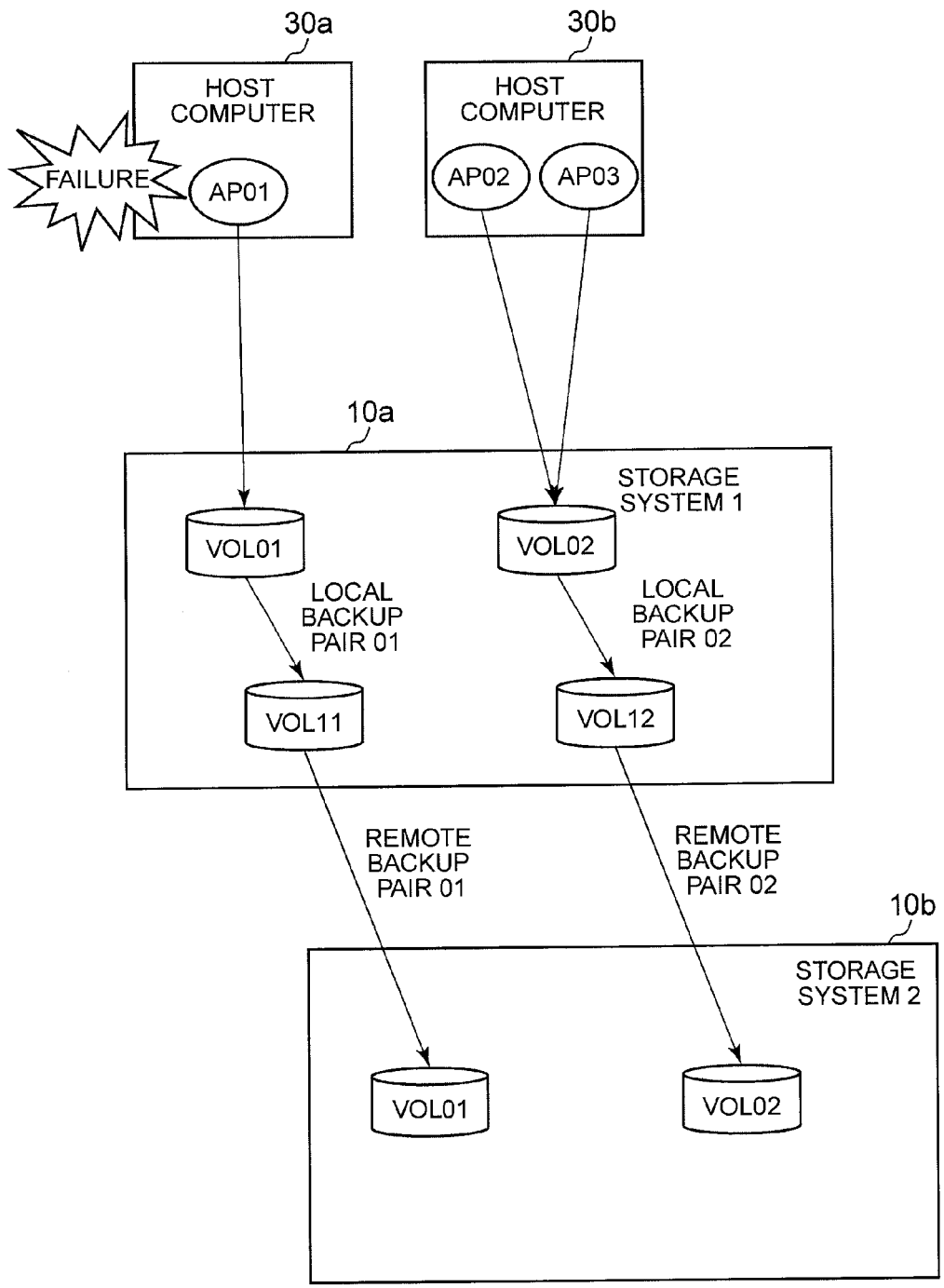
FIG. 2 is a diagram showing the backup configuration of the first example.

FIG. 2 is a diagram showing an example of a backup configuration of the first example. In the example of FIG. 2, an application AP01 is using a volume VOL01 of a storage system 1, and the data stored in this volume VOL01 is locally backed up in a volume VOL11. In addition, the volume VOL11, which stores the backup data of the data of the volume VOL01, is remotely backed up on a volume VOL01 in a storage system 2. Further, applications AP02, AP03 are using a volume VOL02 of the storage system 1, and this volume is locally backed up on a volume VOL12. In addition, the volume VOL12, which stores the backup data of the data of the volume VOL02, is remotely backed up on a volume VOL02 in the storage system 2. That is, a local backup is a data backup that is performed inside the same storage, and a remote backup is a data backup that is performed with respect to a different storage. When carrying a backup like this, for example, in a case where a failure occurs in the AP01 of the host computer as shown in this drawing, a determination is made based on the failure mode as to whether to continue or to suspend the backup.

Figure 3:
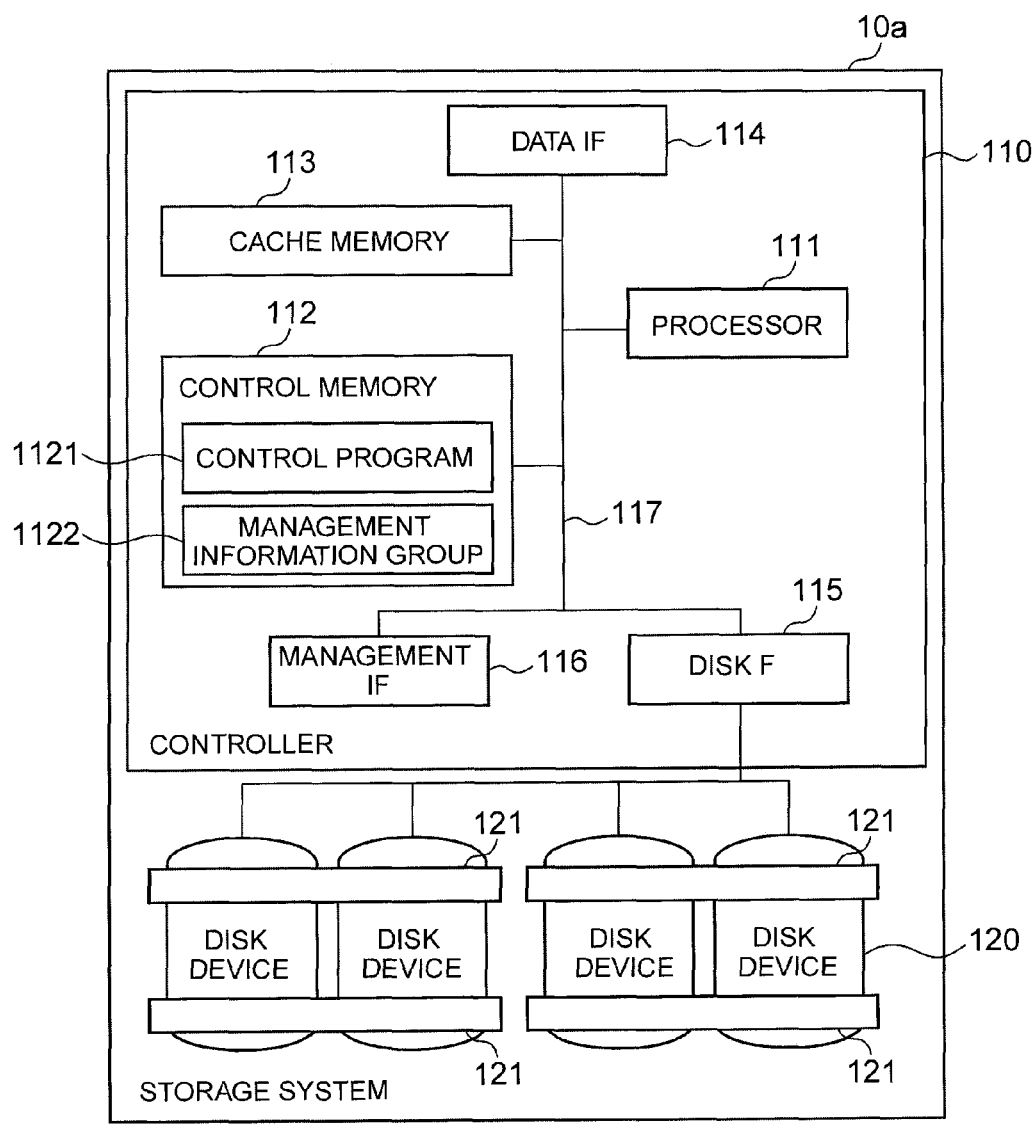
FIG. 3 is a diagram showing the configuration of a storage system of the first example.

FIG. 3 is a diagram showing an example of the configuration of the storage system 10a of the first example. The storage system 10a comprises a controller 110 and a disk device 120.

The disk device 120 stores write-requested data from the host computers 30a, 30b. A storage device such as a flash memory drive may be used instead of the disk device 120.

The controller 110 controls the entire storage system 10a. Specifically, the controller 110 controls the writing of data to the disk device 120 and the reading of data from the disk device 120. Further, the controller 110 provides the storage area of the disk device 120 to the host computers 30a, 30b as one or more logical volumes 121. Furthermore, a plurality of disk devices 120 may exist, and a logical volume 121 is typically configured from a plurality of disk devices 120 using RAID (Redundant Arrays of Independent Disks) technology to increase capacity and heighten reliability. The logical volume will simply be called a volume hereinbelow.

The controller 110, as shown in the drawing, comprises a processor 111, a control memory 112, a cache memory 113, a data interface 114, a disk interface 115, and a management interface 116, and these components are interconnected via an internal network 117. These components may each be duplexed in accordance with making the configuration redundant.

The processor 111 carries out a variety of processing by executing a control program 1121 stored in the control memory 112.

A management information group 1122 which is required by the processor 111 and the control program 1121 executed by the processor 111 are stored in the control memory 112. Specifically, the control program 1121 comprises a program for processing an I/O request received by the data interface 114, a program for controlling a data write to the disk device 120 and a data read from the disk device 120, a program for establishing a volume 121 from the storage area of one or more disk devices 120, and a program for controlling a local backup and a remote backup. The management information group 1122 comprises information showing the relationship between a plurality of volumes 121. The information showing the relationship between the plurality of volumes 121 comprises information denoting the type of the volume 121, information denoting the volume 121 in which the data stored in the volume 121 will be locally backed up, and information denoting the volume 121 in which the data stored in the volume 121 will be remotely backed up.

The cache memory 113 temporarily stores data to be written to the disk device 120 and data read out from the disk device 120.

The data interface 114 is for carrying out communications between the host computers 30a, 30b and the other storage system 10b connected by way of the storage network 50. Specifically, the data interface 114 is used to receive an I/O request (for example, a read request and a write request) from the host computers 30a, 30b, and to send data read out from the disk device 120 to the host computers 30a, 30b. In addition, when a remote backup is implemented, the data interface 114 is used to send and receive the data exchanged between the storage systems 10a, 10b.

The disk interface 115 is for carrying out communications with the disk device 120, which is connected via the internal network 117. For example, the disk interface 115 is used to fetch data stored in the cache memory 113 and store this data in the disk drive 120, and to read out data from the disk drive 120 and write this data to the cache memory 113.

The management interface 116 is for carrying out communications with the management computer 20, which is connected via the management network 40. For example, the management interface 116 is used to receive an instruction (for example, a backup instruction) from the management computer 20.

Since the configuration of the storage system 10b is the same as that of the storage system 10a, an explanation of this configuration will be omitted. However, operation-wise, the storage system 10a and the storage system 10b are allocated different roles. That is, the storage system 10a operates during normal operation time, and the storage system 10b is for backing up the data of the storage system 10a in preparation for when the data stored in the storage system 10a is lost.

Figure 4:
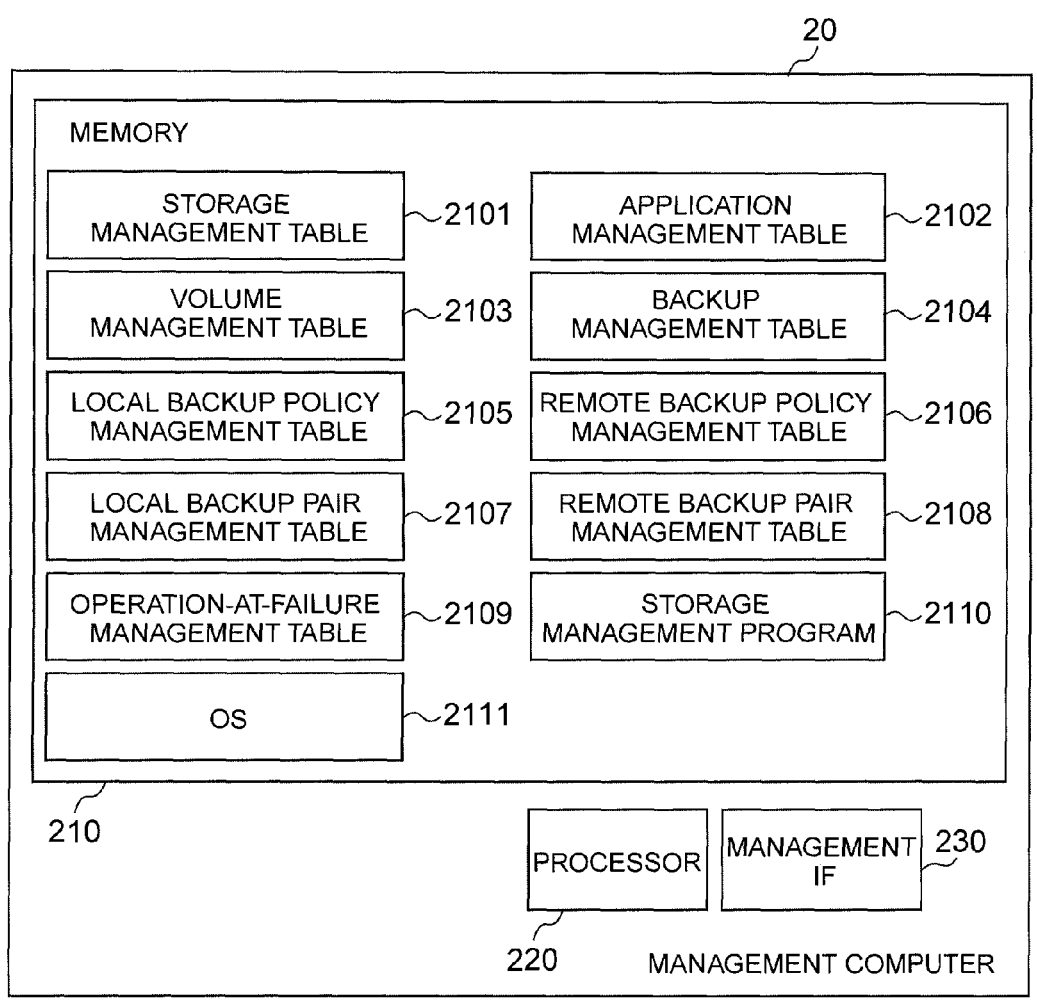
FIG. 4 is a diagram showing the configuration of a management computer of the first example.

FIG. 4 is a diagram showing an example of the configuration of the management computer 20 of the first example. The management computer 20 is for managing the storage systems 10a, 10b, and comprises a memory 210, a processor 220 and a management interface 230. The memory 210, the processor 220 and the management interface 230 are interconnected in accordance with an internal network (omitted from the drawing).

The processor 220 performs various processing by executing a program that is stored in the memory 210.

The memory 210 stores a program, which is executed by the processor 220, and a table, which is required by the processor 220. Specifically, the memory 210 stores a storage management table 2101, an application management table 2102, a volume management table 2103, a backup management table 2104, a local backup policy management table 2105, a remote backup policy management table 2106, a local backup pair management table 2107, a remote backup pair management table 2108, an operation-at-failure management table 2109, and a storage management program 2110. In addition, an OS (Operating System) 2111 is also stored in the memory. The OS 2111 is a program for controlling all the operations of the management computer 20. Furthermore, each table will be explained in detail using FIGS. 6 through 14.

Furthermore, the information-storage format of the memory will be explained below as a table, but the storage format is not limited to a table, and, for example, a list may be used.

The management computer 20 provides the user with a user interface for managing the storage systems 10a, 10b by executing the storage management program 2110 on the OS 2111 under the control of the processor 220, and via an operation by the user, carries out management so as to issue settings and execution instructions to the storage systems 10a, 10b and monitor the operational status of the storage systems 10a, 10b. For example, in a case where the user has registered a backup schedule beforehand, the storage management program 2110 sends either a local backup or a remote backup instruction at the scheduled time to the control program 1121 on the storage system 10a.

Figure 5:
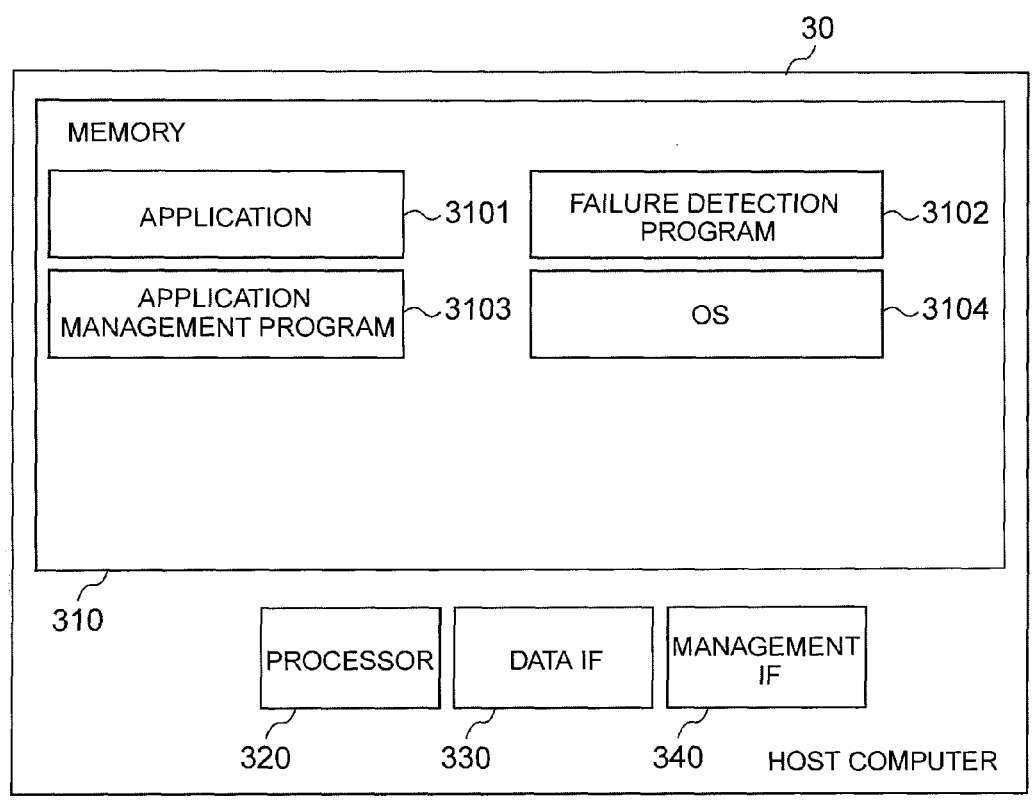
FIG. 5 is a diagram showing the configuration of a host computer of the first example.

FIG. 5 is a diagram showing an example of the configuration of the host computer 30a of the first example. The host computer 30a, for example, forms the core of a banking business system or an airline seating reservation system, and comprises a memory 310, a processor 320, a data interface 330, and a management interface 340. The memory 310, the processor 320, the data interface 330, and the management interface 340 are interconnected by way of an internal network (omitted from the drawing).

The memory 310 stores a program, which is executed by the processor 320, and a table, which is required by the processor 320. Specifically, the memory 310 stores an application 3101, a failure detection program 3102, an application management program 3103 and an OS 3104.

The application 3101 is a program that uses data stored in the volume 121, and carries out a data write to the volume 121 and a data read from the volume 121. For example, the application 3101 may be an application program for managing a database, or an application program for detecting and removing a computer virus.

The failure detection program 3102 is for checking for a failure in the application 3101, and upon detecting a failure, for notifying the storage management program 2110 of the application in which the failure occurred and the mode of this failure. The failure detection program 3102, for example, detects a failure by referencing the operation log of the application 3101. Referencing the log enables the failure detection program 3102 to obtain failure information, such as the fact that the application failed to open a file, to deduce from this information that data was lost, and to make a determination that the data in the backup-destination volume, which comprises this data, has also been lost.

Furthermore, the method for notifying the storage management program 2110 of a failure is not limited to the method cited in this embodiment, and electronic mail may also be used to carry out the notification.

The application management program 3103 is for controlling the operation of the application 3101 when the data stored in the volume 121 being used by the application 3101 is subjected to a local backup, and when the data stored in the volume 121 is restored. For example, the application management program 3103 staticizes the operation of the application 3101 when the data stored in the volume 121 is backed up.

Further, the application management program 3103 collects information that identifies the volume 121 that is being used by the application 3101, and sends this collected information to the storage management program 2110.

The configuration of the host computer 30b is the same as that of the host computer 30a, and as such, an explanation of this configuration will be omitted. Further, the management computer and the host computer each have input devices (omitted from the drawing).

FIG. 6 is a diagram showing an example of the storage management table 2101 of the first example. The storage management table 2101 is for managing the network addresses of the storage systems 10a, 10b managed by the management computer 20. Each entry in the storage management table 2101 comprises a storage ID column 21011 and an IP address column 21012. The unique identifier of the storage system that is connected to the management computer 20 is registered in the storage ID column 21011. A network address that has been assigned to the management interface of the storage system identified by the storage system identifier registered in the storage ID column 21011 is registered in the IP address column 21012.

Furthermore, the user sets the information in the respective columns of the storage management table 2101 by way of a user interface provided by the storage management program 2110.

FIG. 7 is a diagram showing an example of the volume management table 2103 of the first example. The volume management table 2103 is for managing information related to the volumes 121 provided by the storage systems 10a, 10b that are managed by the management computer 20. Each entry of the volume management table 2103 comprises a storage ID column 21031, a volume ID column 21032, a capacity column 21033, and a utilization flag column 21034. The unique identifier of the storage system is registered in the storage ID column 21031. The unique identifier of the volume provided by the storage system identified by the storage system identifier registered in the storage ID column 21031 is registered in the volume ID column 21032. The capacity of the volume identified by the identifiers registered in the storage ID column 21031 as well as the volume ID column 21032 is registered in the capacity column 21033. Information denoting whether or not the volume identified by the identifiers registered in the storage ID column 21031 as well as the volume ID column 21032 is in use is registered in the utilization flag column 21034.

Furthermore, data, which is acquired from the control program provided in the storage system registered in the storage management table 2101, is registered in each column of the volume management table 2103.

FIG. 8 is a diagram showing an example of the application management table 2102 of the first example. The application management table 2102 is for managing the relationship between the application 3101 running on the host computers 30a, 30b managed by the management computer 20, and the volume 121 that the application 3101 is using.

Each entry of the application management table 2102 comprises an application ID column 21021, an IP address column 21022, a storage ID column 21023, and a volume ID column 21024. The unique identifier of the application running on a host computer is registered in the application ID column 21021. A network address that has been assigned to the management interface of the host computer that is running the application identified by this application identifier is registered in the IP address column 21022. The unique identifier of the storage system comprising the volume being used by the application identified by this application identifier is registered in the storage ID column 21023. The unique identifier of the volume being used by the application identified by this application identifier is registered in the volume ID column 21024.

Furthermore, the user sets the information in the application ID column 21021 and the IP address column 21022 via the user interface provided by the storage management program 2110. The identifier of the volume being used by the application identified by the user-set application identifier and the identifier of the storage system to which this volume belongs are set in the storage ID column 21023 and the volume ID column 21024. These identifiers are acquired from the host computer to which the user-set IP address has been assigned.

FIG. 9 is a diagram showing an example of the backup management table 2104 of the first example. The backup management table 2104 is for managing the backup status of a volume being used by the application 3101.

Each entry of the backup management table 2104 comprises an application ID column 21041, a backup type column 21042, a policy ID column 21043, and a backup status column 21044. The unique identifier of the application running on a host computer is registered in the application ID column 21041. An identifier for identifying whether the volume being used by the application identified by this application identifier will be backed up locally, and also backed up remotely is registered in the backup type column 21042. Specifically, in a case where a local backup is performed, "local" is registered, and in a case where the locally backed up data is also backed up remotely, "remote" is registered. The unique identifier of a local backup policy is registered in the policy ID column 21043 in a case where the backup type is "local", and the unique identifier of a remote backup policy is registered in the policy ID column 21043 in a case where the backup type is "remote". Furthermore, the respective policies will be explained using FIGS. 10 and 11.

An identifier for identifying whether a backup is valid or invalid based on the policy registered in the policy column 21043 is registered in the backup status column 21044, with "valid" being registered in a case where the backup is valid, and "invalid" being registered in a case where the backup is not valid. In a case where "valid" has been registered, when the time set in the policy identified by the identifiers registered in the backup type column 21042 and the policy ID column 21043 arrives, the storage management program 2110 sends to the control program 1121 in the storage system 10a a backup instruction with respect to the pair set in this policy.

Furthermore, in a case where there has been a change in the backup status column 21044 of an entry, a backup instruction to the effect that the backup status has changed may be sent to the control program 1121 in the storage system 10a with respect to the pair set in the entry.

Further, the user sets the information in each column of the backup management table 2104 via the user interface provided by the storage management program 2110. Details will be explained using FIGS. 17 and 18.

Further, the backup management table 2104 may also be configured so as to comprise a pair ID column for specifying the backup pair, thereby making it possible for the storage management program 2110 to specify the backup pair by simply referencing the backup management table 2104.

In the example of FIG. 9, the data of the volume being used by the application having the application identifier AP01 is undergoing a local backup in accordance with the local backup policy having the policy identifier LP01. Further, the locally backed up backup data is undergoing a remote backup in accordance with the remote backup policy having the policy ID RP01.

FIG. 10 is a diagram showing an example of the local backup policy management table 2105 of the first example. The local backup policy management table 2105 is for managing the relationship (policy) between the backup pair and the schedule when implementing a local backup.

Each entry of the local backup policy management table 2105 comprises a local backup policy ID column 21051, a pair ID column 21052, and a schedule column 21053. The unique identifier of the local backup policy is registered in the local backup policy ID column 21051. The unique identifier that has been assigned to the pair comprising the backup-source volume and the backup-destination volume, which are managed in accordance with the local backup pair management table 2107, is registered in the pair ID column 21052. Schedule information as to the date, day and time that a backup commences is registered in the schedule column 21053.

Furthermore, the user sets the information in the respective columns of the local backup policy management table 2105 via the user interface provided by the storage management program 2110. Details will be explained using FIG. 17.

In the example of FIG. 10, everyday at 00:00 the data in the backup-source volume that configures the pair having the pair ID PAIR01 is backed up to the backup-destination volume configuring the pair having the same PAIR01 pair ID.

FIG. 11 is a diagram showing an example of the remote backup policy management table 2106 of the first example. The remote backup policy management table 2106 is for managing the relationship (policy) between the backup pair and the schedule when implementing a remote backup.

Each entry of the remote backup policy management table 2106 comprises a local backup policy ID column 21061, a pair ID column 21062, and a schedule column 21063. The unique identifier of the remote backup policy is registered in the remote backup policy ID column 21061. The unique identifier that has been assigned to the pair comprising the backup-source volume and the backup-destination volume, which is managed in accordance with the remote backup pair management table 2108, is registered in the pair ID column 21062. Schedule information as to the date, day and time that a backup commences is registered in the schedule column 21063.

Furthermore, the user sets the information in the respective columns of the remote backup policy management table 2106 via the user interface provided by the storage management program 2110. Details will be explained using FIG. 18.

Figure 12:
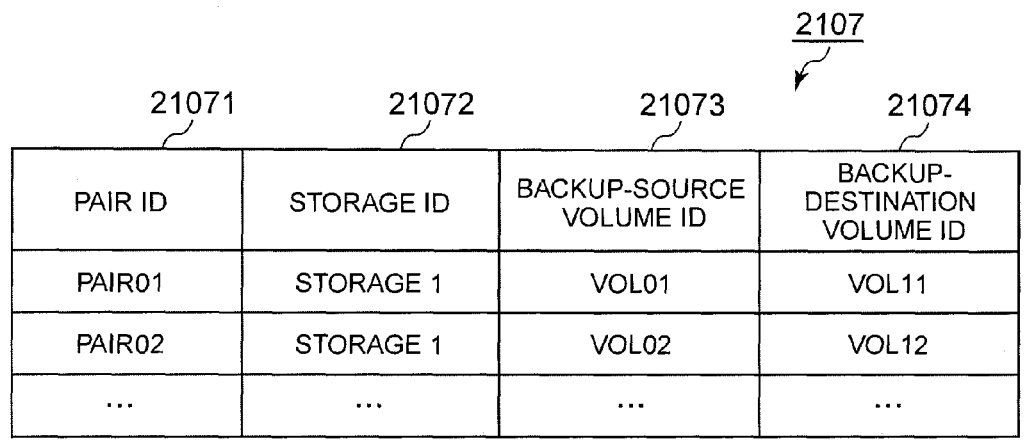
FIG. 12 is a diagram showing the structure of a local backup pair management table of the first example.

FIG. 12 is a diagram showing an example of the local backup pair management table 2107 of the first example. The local backup pair management table 2107 is for managing the pair relationship of the backup-source volume and the backup-destination volume when implementing a local backup.

Each entry of the local backup pair management table 2107 comprises a pair ID column 21071, a storage ID column 21072, a backup-source volume ID column 21073, and a backup-destination volume ID column 21074. The unique identifier of a pair is registered in the pair ID column 21071. The unique identifier of the storage system that comprises the backup-source volume and the backup-destination volume is registered in the storage ID column 21072. The unique identifier of the backup-source volume is registered in the backup-source volume ID column 21073. The unique identifier of the volume that is the backup destination of the data of the volume identified by this backup-source volume identifier is registered in the backup-destination volume ID column 21074.

Furthermore, the user sets the information in the respective columns of the local backup pair management table 2107 via the user interface provided by the storage management program 2110. Details will be explained using FIG. 17.

Figure 13:
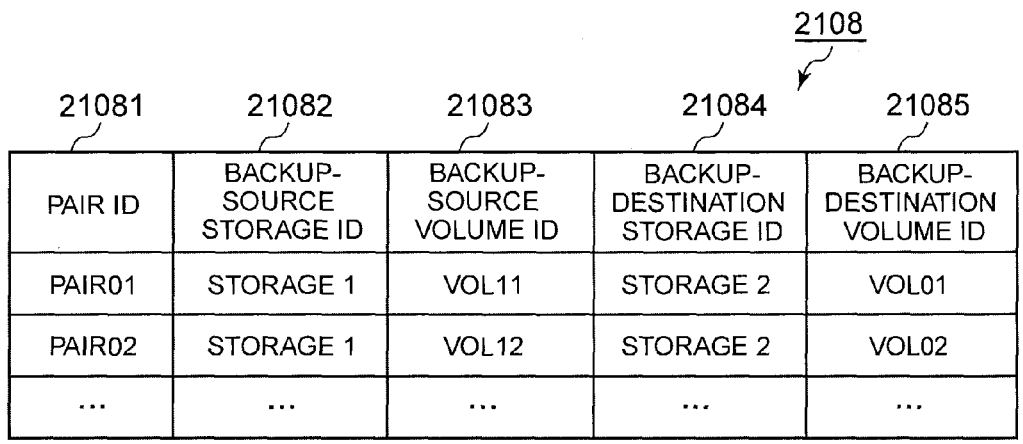
FIG. 13 is a diagram showing the structure of a remote backup pair management table of the first example.

FIG. 13 is a diagram showing an example of the remote backup pair management table 2108 of the first example. The remote backup pair management table 2108 is for managing the pair relationship of the backup-source volume and the backup-destination volume when implementing a remote backup.

Each entry of the remote backup pair management table 2108 comprises a pair ID column 21081, a backup-source storage ID column 21082, a backup-source volume ID column 21083, a backup-destination storage ID column 21084, and a backup-destination volume ID column 21085. The unique identifier of a pair is registered in the pair ID column 21081. The unique identifier of the storage system that comprises the backup-source volume is registered in the backup-source storage ID column 21082. The unique identifier of the backup-source volume is registered in the backup-source volume ID column 21083. The unique identifier of the storage system that comprises the volume that is the backup destination of the data stored in the volume identified by this backup-source volume identifier is registered in the backup-destination storage ID column 21084. The unique identifier of the volume that is the backup destination of the data of the volume identified by this backup-source volume identifier is registered in the backup-destination volume ID column 21085.

Furthermore, the user sets the information in the respective columns of the remote backup pair management table 2108 via the user interface provided by the storage management program 2110. Details will be explained using FIG. 18.

Figure 14:
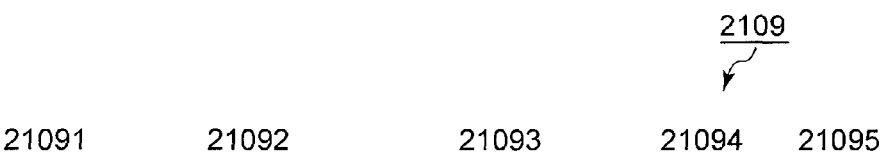
FIG. 14 is a diagram showing the structure of an operation-at-failure management table of the first example.

FIG. 14 is a diagram showing an example of the operation-at-failure management table 2109 of the first example. The operation-at-failure management table 2109 is for defining a backup operation when a logical failure has been detected in the application 3101 running on a host computer 30a, 30b.

Each entry of the operation-at-failure management table 2109 comprises a volume ID column 21091, an application ID column 21092, a failure ID column 21093, an operation-at-failure column 21094, and a priority column 21095. The unique identifier of the volume is registered in the volume ID column 21091. The unique identifier of the application that is using the volume identified by this volume identifier is registered in the application ID column 21092. In a case where a plurality of applications are sharing a single volume, a plurality of application identifiers are registered in the application ID column 21092. The unique identifier of the failure that occurred in the application is registered in the failure ID column 21093. In the case of an arbitrary failure (a case where the failure is not limited) an asterisk "*" is registered in the failure ID column 21093. Whether the remote backup set for the application identified by the identifier registered in the application ID column 21092 is to be suspended or continued is registered in the operation-at-failure column 21094 when a failure identified by the identifiers registered in the volume ID column 21091, the application ID column 21092 and the failure ID column 21093 has occurred. Specifically, "suspend" is registered in a case where the remote backup is to be suspended when a failure has occurred, and "continue" is registered in a case where the remote backup is to be continued without suspension even in a case where a failure has occurred. A priority showing the extent to which the user must respond when a failure has occurred in an application is registered in the priority column 21095. Furthermore, the higher the numeric value in the priority column 21095, the higher the priority.

In the example of FIG. 14, when a failure occurs in the application AP01 that is using the volume VOL01, the storage management program 2110 unconditionally suspends the remote backup. Alternately, the storage management program 2110 suspends the remote backup when the failure F04 (staticization failed) occurs in the application AP03 that is using the volume VOL02. The storage management program 2110 also suspends the remote backup when the failures F01 (virus detected) and F04 (staticization failed) occur simultaneously in the applications AP02 and AP03 that are using the volume VOL02 based on the high-priority failure F04 (staticization failed).

Furthermore, the user sets the information in the respective columns of the operation-at-failure management table 2109 via the user interface provided by the storage management program 2110. Details will be explained using FIGS. 19 and 20.

Figure 15:
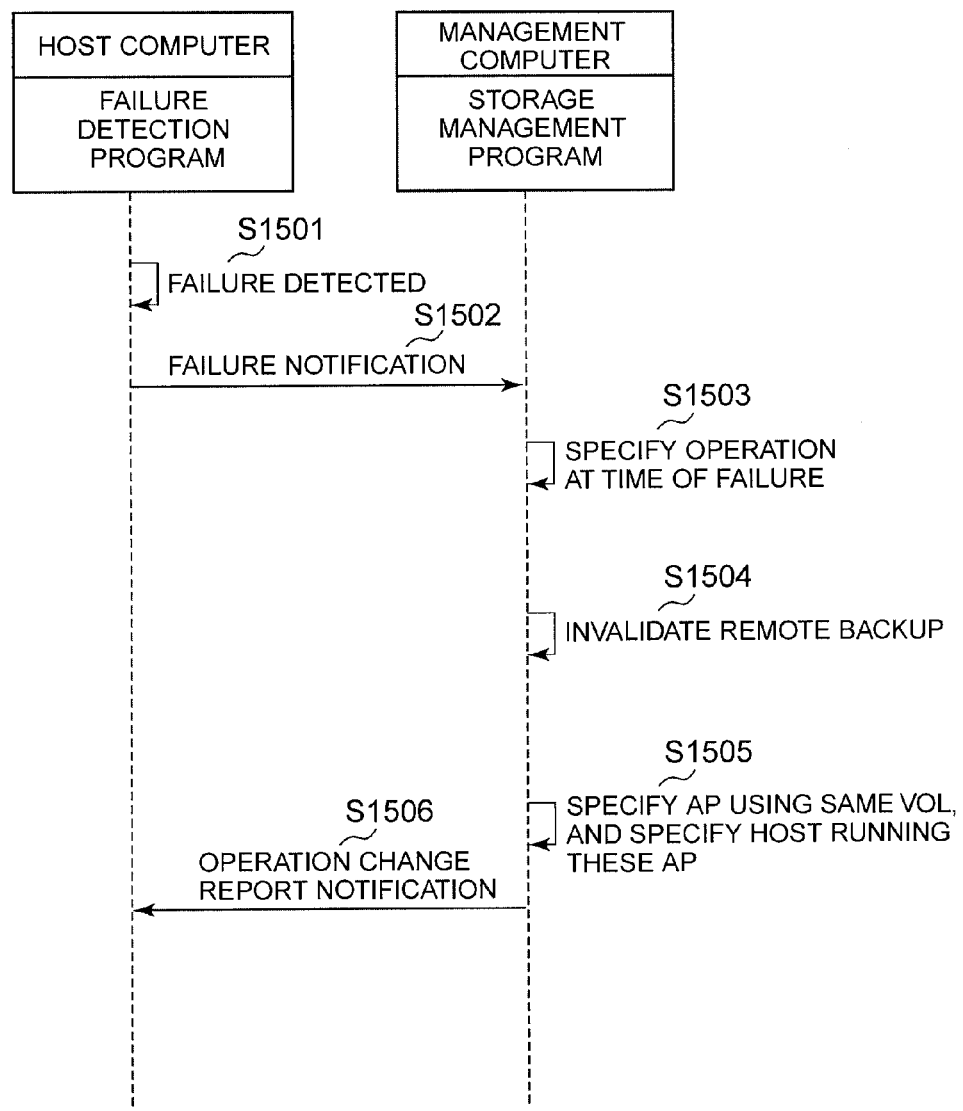
FIG. 15 is a diagram showing the processing sequence of the first example when a failure occurs in an application.

FIG. 15 is a diagram showing an example of the processing sequence in the first example when a logical failure has been detected in the application.

The failure detection program 3102, upon detecting a failure based on the log outputted by the application (S1501), sends a failure notification to the storage management program 2110 (S1502). The failure notification comprises the identifier of the application in which the failure occurred, the identifier of the failure that occurred, and the identifier of the volume with respect to which the failure occurred. In a case no distinction is made regarding the failure that occurred, the identifier of the failure that occurred may be omitted. Further, in this example, it is supposed that there is one application identifier included in the failure notification, and in a case where a plurality of failures occur simultaneously in the same application, a plurality of failure identifiers may be included. Further, as for the identifier identifying the volume, the storage management program 2110 may reference the application management table 3103 to specify the volume being used by the application identified by the application identifier.

Next, the storage management program 2110 references the operation-at-failure management table 2109 to acquire the priorities registered in the priority column 21095 for all the entries specified by the volume identifier, the application identifier and the failure identifier included in the failure notification. Then, the storage management program 2110 acquires the operation at the time of failure registered in the operation-at-failure column 21094 of the entry for which the highest priority is registered (S1503). In a case where the acquired operation at the time of failure is "suspend", the storage management program 2110 references the backup management table 2104 and invalidates the remote backup to the volume that is being used by the application in which the failure occurred. That is, the storage management program 2110 sets the backup status column 21044 of the backup management table 2104 to "invalid" (S1504). In a case where the acquired operation at the time of failure is "continue", the processing ends as-is.

Furthermore, when all the operations at the time of failure have been set to "suspend", a decision as to whether or not the operation will change at the time of a failure, that is, whether or not the backup status column 21044 of the backup management table 2104 will change may be made in accordance with whether or not the value of the highest priority exceeds a threshold value set beforehand by the user. In accordance with this, the operation-at-failure column 21094 may be deemed unnecessary. In so doing, for example, it is conceivable that the operation at the time of failure will be set to "suspend" in a case where the priority exceeds the threshold value, and in a case where there is a plurality of failures and the total value of the priorities of these failures exceeds the threshold value. In accordance with this, for example, backup processing may be divided between the daytime and the nighttime, making possible operations that correspond with the environment and circumstances.

Next, in a case where the backup has been invalidated, the storage management program 2110 references the operation-at-failure management table 2109 and acquires all the identifiers of the applications that are using the volume to which the backup has been suspended. Then, the storage management program 2110 references the application management table 2102 and specifies the host computer on which the applications identified by the acquired identifiers are running (S1505).

Next, the storage management program 2110 issues an operation change report to the specified host computer (S1506). In accordance with this, the report is sent not only to the host computer on which the application in which the failure occurred is running, but also to the host computer on which is running the other application that uses the volume for which the remote backup was suspended due to the failure.

Furthermore, instead of issuing the report to the specified host computer, the storage management program 2110 may manage in advance the point-of-contact (the e-mail address) of the administrator who manages the respective applications, and may send the report to this e-mail address. Further, the operation change report may also comprise the identifier for identifying the backup-suspended volume and the cause of the failure.

Figure 16:
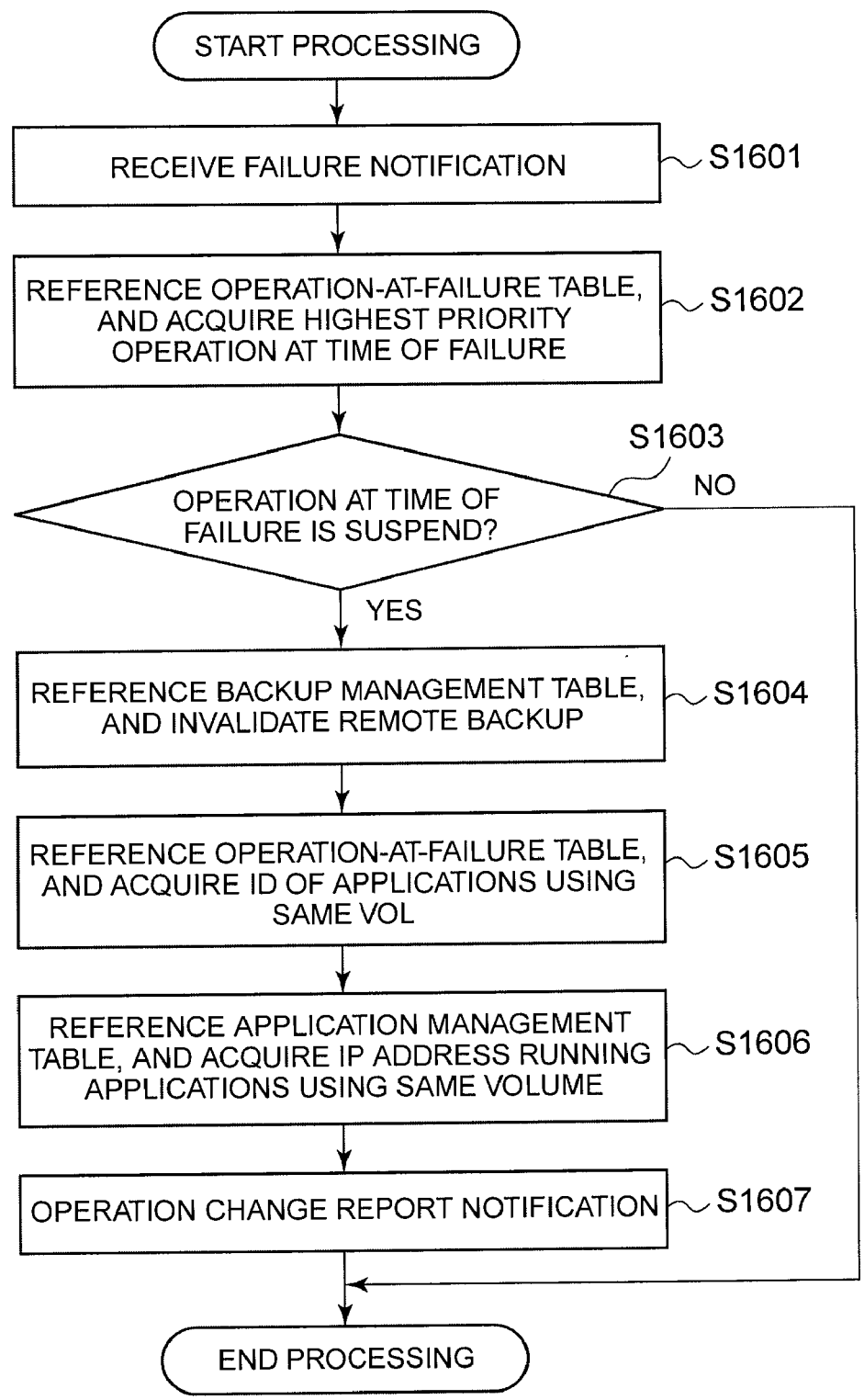
FIG. 16 is a diagram showing the processing flow of the storage management program of the first example when a failure occurs in the application.

FIG. 16 is a diagram showing an example of the processing flow of the storage management program 2110 in the first example when the occurrence of a logical failure is detected in the application.

The storage management program 2110 receives the failure notification from the failure detection program 3102 (S1601).

Next, the storage management program 2110 references the operation-at-failure management table 2109 and acquires the priorities registered in the priority column 21095 for all the entries specified by the volume identifier, the application identifier, and the failure identifier included in the failure notification. Then, the storage management program 2110 acquires the operation at the time of failure registered in the operation-at-failure column 21094 of the entry registered with the highest priority (S1602).

Next, the storage management program 2110 determines whether the acquired operation at the time of failure is "suspend" or "continue" (S1603). In the case of "continue" (S1603: No), the storage management program 2110 ends the processing. Furthermore, in accordance with this, the storage management program 2110 sends a remote backup instruction to the control program 1121 at a preset time.

In a case where the result of the determination of S1603 is "suspend" (S1603: Yes), the storage management program 2110 references the backup management table 2104 and invalidates the remote backup of the volume being used by the application in which the failure has occurred. That is, the storage management program 2110 sets the backup status column 21044 of the backup management table 2104 to "invalid" (S1604).

Next, the storage management program 2110 references the operation-at-failure table 2109 and acquires all of the identifiers of the applications that are using the volume for which the backup was suspended (S1605). Next, the storage management program 2110 references the application management table 2102, acquires the IP address of the host computer on which is running the application that is identified by the identifier of the application acquired in S1605 (S1606), issues an operation change report to the host computer assigned this IP address (S1607), and ends the processing.

Furthermore, upon receiving the failure notification, the storage management program 2110 may notify the storage system, which is the remote backup destination, of the possibility that the data in which the failure occurred is to be backed up or is already backed up. In addition, the storage management program 2110 may store this information in the storage system and the management computer. For example, the storage management program 2110 may provide a new data status column in the volume management table 2103, and store the data status by registering "failure data" in a case where there is the possibility that the data in which the failure occurred is being stored, and "no failure data" in a case where the data in which the failure occurred does not exist. In accordance with this, prior to carrying out a restore using the remotely backed up data, the user is able to check whether or not there is a likelihood that the abnormal data is included in the backup data.

Further, the storage management program 2110 may be provided with a function for receiving a successful restore notification denoting that the restore from the failure was a success and that the locally backed up data has returned to normal, and may resume the remote backup upon receiving this successful restore notification. That is, the storage management program 2110 sets the backup status column 21044 of the backup management table 2104 to "valid". At this time, the storage management program 2110 need not wait until a pre-scheduled time to resume the remote backup, but rather may temporarily carry out the remote backup. In accordance with this, it becomes possible to resume the remote backup in conformance with the failure restore status.

Further, when the failure is a virus, there are cases in which the impact of this virus must be taken into account. For example, in a case where AP02 is infected with a virus and the volume being used by AP02 is VOL02, depending on the type of virus, the other volume VOL01 inside the same storage could also be affected, and in accordance with this, all of the backups to the affected VOL01 and VOL02 must be suspended, and processing must not be resumed until after recovery. In a case like this, the storage management program 2110 receives a notification (S1502) from the failure detection program 3102 to the effect that the failure mode is a virus infection, and also receives a notification as to the VOL which is affected by the virus infection. The storage management program 2110 also specifies the operation at the time of failure for the F02 (virus infection) of the failure ID column 21093 for the virus infection affected VOL other than the VOL that the failed AP is using, and carries out processing in accordance with the specified operation. In accordance with this, the computer system as a whole is able to carry our appropriate processing even in the case of a virus infection.

FIG. 17 is a diagram showing an example of a local backup setting screen 5000 of the first example. The local backup setting screen 5000 is provided by the storage management program 2110. The user is able to make a setting related to a local backup by way of the local backup setting screen 5000, and this setting is registered in each column of the backup management table 2104, each column of the local backup pair management table 2107, and each column of the local backup policy management table 2105 via the local backup setting screen 5000.

An application ID specification field 5001 is displayed in the local backup setting screen 5000. It is possible to select the unique identifier of an application in the application specification field 5001, and when an application identifier is specified, the storage management program 2110 references the application management table 2102, acquires the identifier of the volume being used by the application identified by this application identifier, and displays this volume identifier in the application specification field 5001. In a case where the application is using a plurality of volumes, a plurality of volumes are displayed.

A backup-destination volume candidate list 5003 is displayed in a backup-destination volume specification field 5002, and it is possible to select the identifier of a volume to be the backup destination. That is, it is possible to select the backup destination of the data being used by the application identified by the identifier of the application that was specified in the application ID specification field 5001. Only a volume that is not being used from among the volumes registered in the volume management table 2103 is displayed in the backup-destination volume candidate list 5003. Further, information such as a volume identifier, the presence or absence of a remote backup, and a remote backup schedule are displayed in the backup-destination volume candidate list 5003. In a case where a remote backup setting has been made for backup-destination candidate volume, "Yes" is displayed in remote backup Yes/No, and in a case where a remote backup setting has not been made, "No" is displayed in remote backup Yes/No. A remote backup schedule is displayed in the remote backup schedule only in a case where remote backup Yes/No is "Yes". The remote backup Yes/No and the remote backup schedule display the storage management program 2110 display information acquired from the remote backup pair management table 2108 and the remote backup policy management table 2106.

It is possible to specify a backup schedule for a local backup in a backup schedule specification field 5004. In the local backup setting screen 5000 of FIG. 17, it is possible to select from among daily, weekly and monthly as the backup frequency, and in a case where daily has been selected, it is possible to select the hour and minute at which the backup will be carried out, in a case where weekly has been selected, it is possible to select the day of the week, the hour and the minute at which the backup will be carried out, and in a case where monthly has been selected, it is possible to select the date, the hour and the minute at which the backup will be carried out.

Furthermore, rather than selecting the backup-destination volume on a by-volume basis, volumes for which the same remote backup policy is employed may be grouped together beforehand and this group may be selected when selecting the volume to serve as the backup destination.

FIG. 18 is a diagram showing an example of a remote backup setting screen 6000 of the first example, the remote backup setting screen 6000 is provided by the storage management program 2110. The user is able to make a setting related to a remote backup by way of the remote backup setting screen 6000, and this setting is registered in each column of the remote backup pair management table 2108 and each column of the remote backup policy management table 2106 via the remote backup setting screen 6000.

A backup-source specification field 6001 is displayed in the remote backup setting screen 6000. In the backup-source specification field 6001, it is possible to select the unique identifier of the storage system comprising the volume to which a remote backup is to be carried out, and the unique identifier of the volume to which the remote backup is to be carried out.

In a backup-destination specification field 6002, it is possible to select the unique identifier of the storage system comprising the volume that is to serve as the backup destination, and the unique identifier of the volume that is to serve as the backup destination.

In a backup schedule specification field 6003, it is possible to specify a backup schedule for a remote backup. The specifiable items are the same as those of the backup schedule specification field 5004 of the local backup setting screen 5000.

Figure 20:
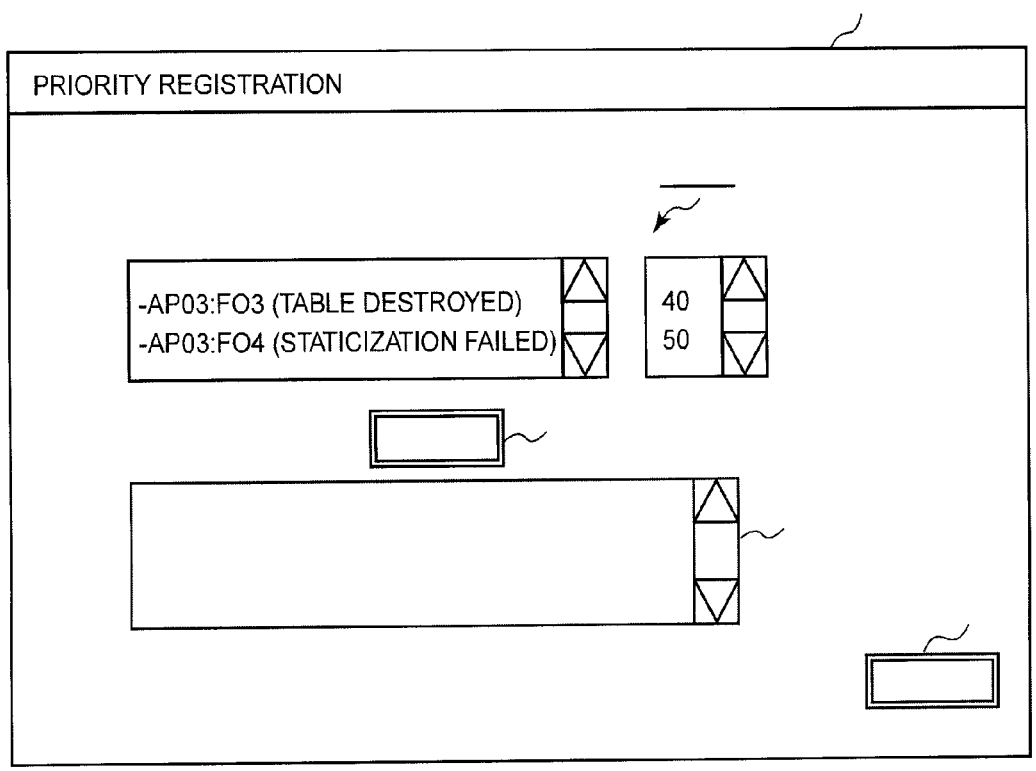
FIG. 20 is a diagram showing a priority setting screen of the first example.

FIGS. 19 and 20 are diagrams showing examples of an operation-at-failure setting screen 7000 and a priority setting screen 8000 of the first example. The operation-at-failure setting screen 7000 and the priority setting screen 8000 are provided by the storage management program 2110. The user is able to decide whether to suspend or continue the remote backup for each application and failure mode via the operation-at-failure setting screen 7000, and is able to decide the priority of the operation at the time of failure when a plurality of logical failures occur in applications using the same volume via the priority setting screen 8000. Further, the user registers these settings in the respective columns of the operation-at-failure management table 2109 via the operation-at-failure setting screen 7000 and the priority setting screen 8000.

An application ID specification field 7001 is displayed in the operation-at-failure setting screen 7000. It is possible to specify the identifier of the application in the application ID specification field 7001.

In an operation-at-failure specification field 7002, it is possible to specify the identifier of a failure that is capable of occurring in the application identified by the application identifier specified in the application ID specification field 7001, and whether to suspend or continue the remote backup when this failure occurs.

The priority setting screen 8000 is displayed when a button 7003 of the operation-at-failure setting screen 7000 is pressed. In the priority setting screen 8000, the failure priority is set by the user for all of the volumes used by the application identified by the application identifier specified in the operation-at-failure setting screen 7000 in preparation for when a plurality of failures occurs in the same volume. Displaying a screen that enables the batch setting of priorities for failures that may occur in the same volume makes it possible for the user to relatively determine a priority by taking into account the importance of another failure. In the priority setting screen 8000 of FIG. 20, when the user selects a combination of a failure mode and a priority in a priority specification field 8001 and presses the add button 8002, the selected failure mode and priority are added to a selection confirmation field 8003. The setting of the operation at the time of failure ends when the user decides the priorities for all the failure modes and presses the determination button 8004.

Furthermore, the authority for managing a local backup via the local backup setting screen 5000 and the authority for managing a remote backup via the remote backup setting screen 6000 may be split. In accordance with this, giving authority for managing a local backup and authority for managing a remote backup to one user makes it possible for the same user to manage both a local backup and a remote backup, and giving the respective authorities to different users makes it possible for different users to manage a local backup and a remote backup. Typically, the user who manages the host computer and the application performs local backup management, and the user who manages the storage performs remote backup management.

Further, the local backup setting screen 5000, the remote backup setting screen 6000, the operation-at-failure setting screen 7000 and the priority setting screen 8000 are outputted by the input/output device of the management computer, and the user carries out the various settings with the input/output device. Furthermore, this input/output device may be a display, a keyboard, a mouse or the like.

Further, even when different users manage the local backup and the remote backup, in a case where the user who manages the local backup is able to define, via the operation-at-failure setting screen 7000 and the priority setting screen 8000, the operation of the remote backup when a failure occurs in the application, it is possible to control the remote backup based on the settings of the user who manages the local backup.

In the above example, the storage management program 2110 comprises a program for determining the suspension or continuation of a remote backup based on the operation-at-failure management table 2109, and in accordance with this, it is possible to realize the suspension or continuation of the remote backup based on the application in which the failure occurred and the mode of this failure. That is, it is possible to prevent the backup from continuing despite the fact that the failure is serious, and to prevent the backup from being suspended despite the fact the failure is trivial. Further, determining the priority for each failure makes it possible to carry out the operation at the time of failure corresponding to the priority even in a case where a plurality of failures have occurred.

Furthermore, this example is also applicable to a configuration in which locally backed up data is once again subjected to a local backup.

Further, in this example, it was explained that the control of the local backup is carried out by the management computer 20, but local backup control may also be carried out by the host computer 30, and the present invention is also valid in a case where the management of a local backup and the management of a remote backup are performed by different management programs. In this case, the memory 310 of the host computer 30 further comprises a local backup management table, a local backup policy management table, a local backup pair management table, and a local backup management program. Further, the backup type column 21042 in the backup management table 2104 of the management computer 20 comprises only the "remote" entry.

The respective details are basically the same as in the case of the management computer 20. The status of the local backup is managed in the local backup management table. Further, the local backup management program exercises control related to the local backup, such as sending a local backup instruction to the control program.

Figure 21:
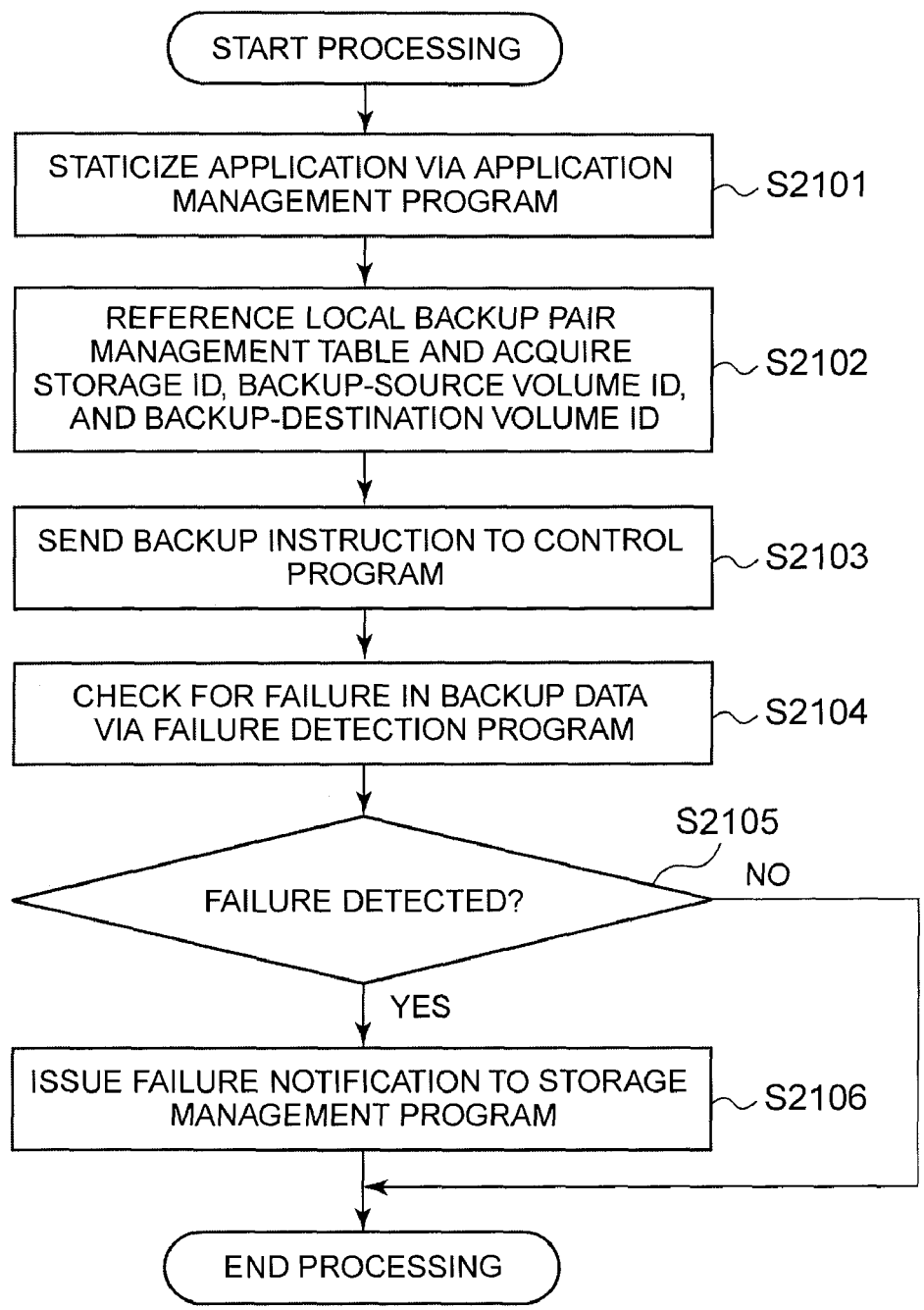
FIG. 21 is a diagram showing a local backup processing flow of the first example.

FIG. 21 shows an example of the local backup processing flow of the local backup management program in a case where the host computer 30 carries out the local backup. Furthermore, the local backup is executed in accordance with the policy registered in the policy column of the entry in which "valid" is registered in the backup status column of the local backup management table.

The local backup management program executes the following processing. First, the application is staticized via the application management program at the time registered in the policy (S2101). Next, the local backup pair management table is referenced, and the storage identifier registered in the storage ID column, the volume identifier registered in the backup-source volume ID column, and the volume identifier registered in the backup-destination volume ID column of the entry specified by the identifier of the pair registered in the pair ID column of the local backup policy management table are acquired (S2102).

Next, a local backup instruction for the backup pair acquired in S2102 is sent to the control program of the storage system 1a (S2103). Next, a check is carried out via the failure detection program 3102 to confirm that a failure has not occurred in the data of the backup-destination volume (S2104). This is done by referencing the application operation log and the like. For example, in a case where the existence of a backup data virus infection is checked by a virus detection program, the verification log is referenced. Further, in a case where an application such as a database management program is using the volume, the database management program log is referenced.

Next, a determination as to the existence of a failure is made based on the results of the check of S2104 (S2105). In the case of a failure (S2105: Yes), a failure notification is issued via the failure detection program 3102 to the storage management program 2110, and processing ends (S2106). Furthermore, the failure notification comprises the identifier of the application in which the failure occurred, the identifier of the failure that occurred, and the identifier of the volume with respect to which the failure occurred.

In accordance with the above, it is possible for the management computer 20 and the host computer 30 to cooperate to control the backup in a case where a failure has occurred in the application even when the host computer 30 controls the local backup.

Figure 22:
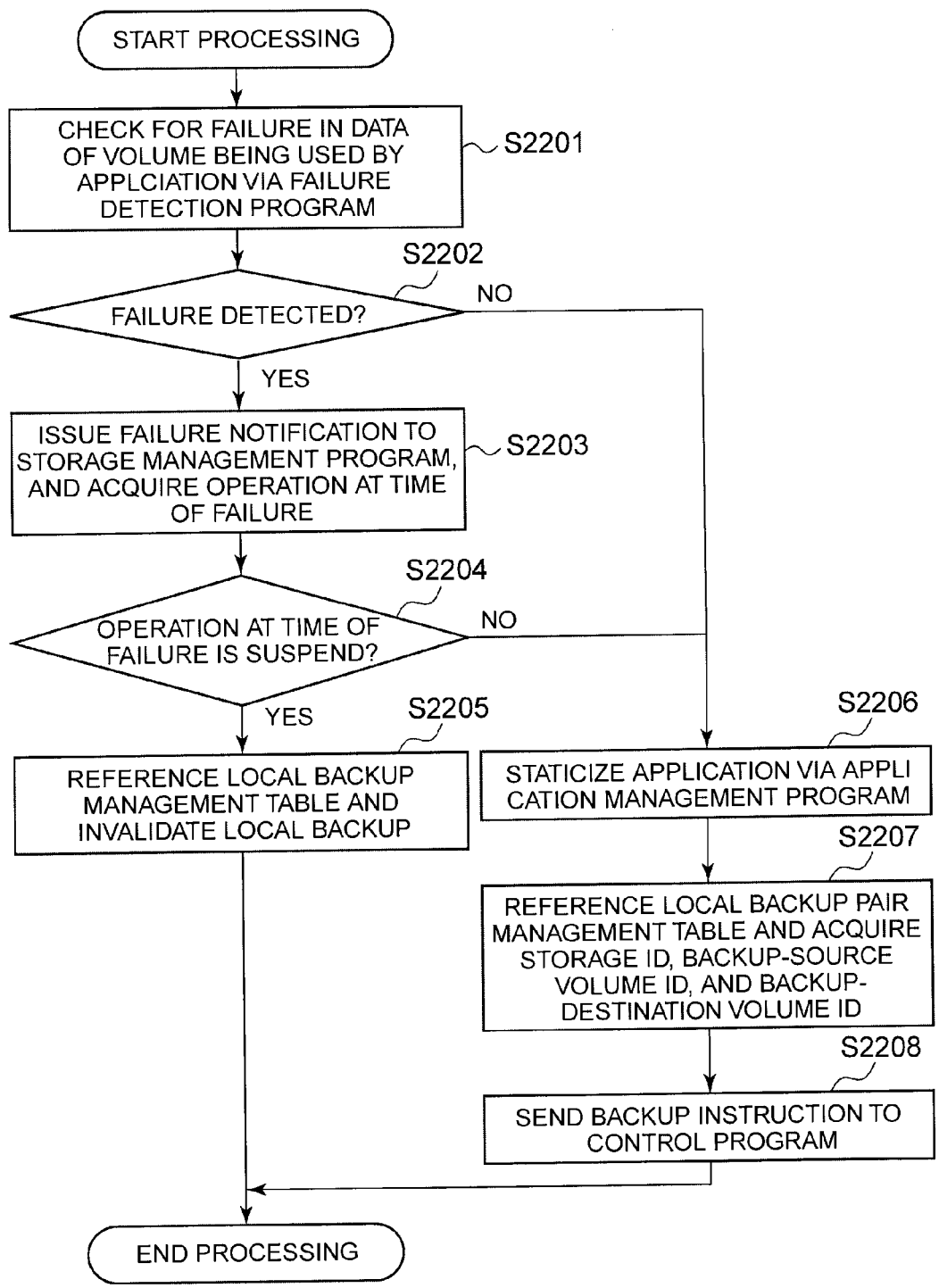
FIG. 22 is a diagram showing a local backup processing flow of the first example.
Figure 23:
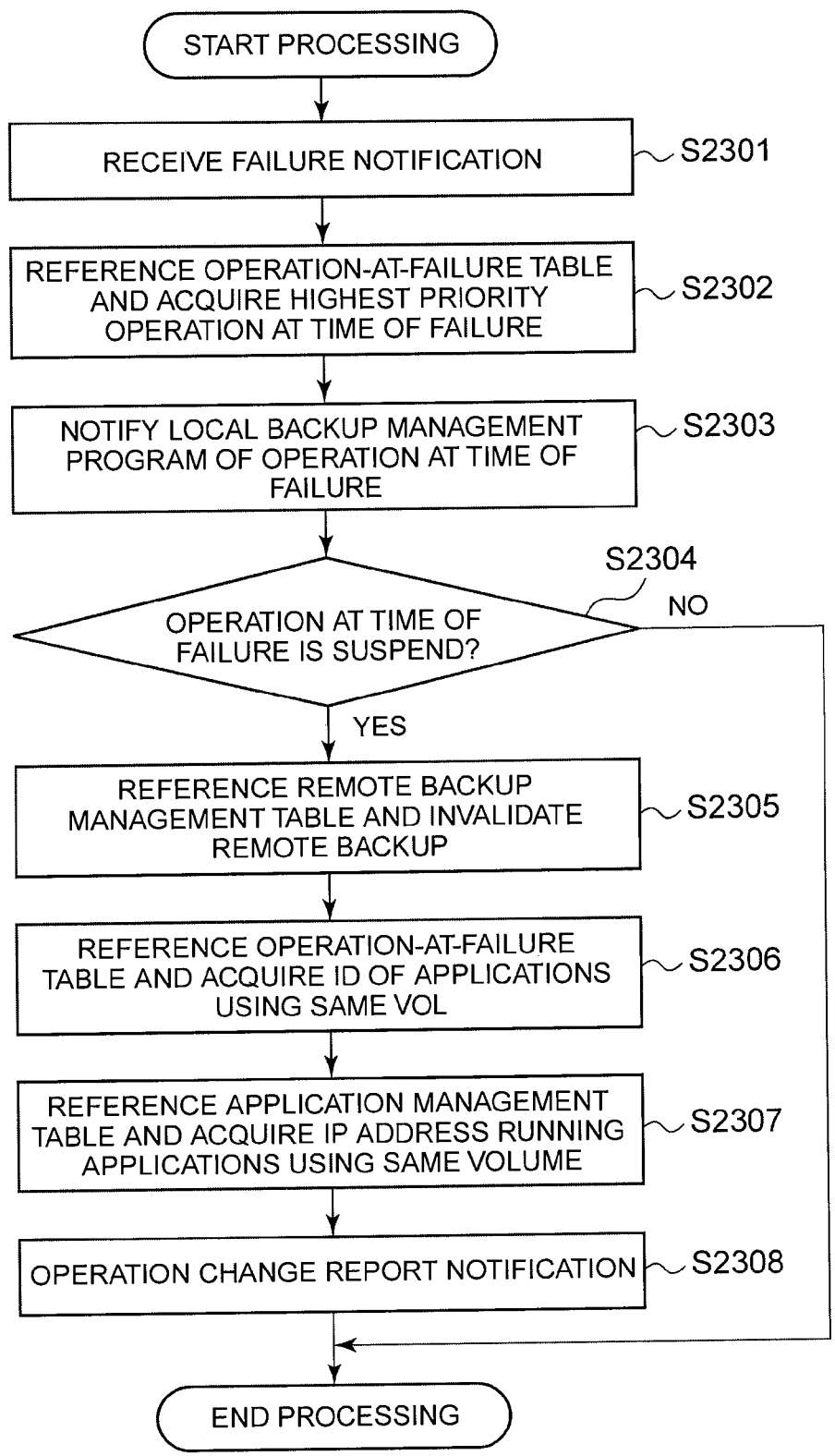
FIG. 23 is a diagram showing the processing flow of the storage management program in the first example when a failure has occurred in the application.

Furthermore, in FIG. 21, the remote backup was suspended when a failure was detected during a failure check of the locally backed up data, but the local backup itself may be suspended when a failure is detected during a failure check performed prior to a local backup. The flow of processing in this case is illustrated in FIG. 22. Further, FIG. 23 shows the processing flow of the storage management program when the local backup management program sends a failure notification to the storage management program during the processing flow of FIG. 22, and the storage management program receives this notification.

FIG. 22 is an example of the local backup processing flow of the local backup management program. The local backup management program carries out a check by way of the failure detection program 3102 to make sure that a logical failure has not occurred in the data of the volume being used by the application (S2201).

Next, a determination is made as to the presence or absence of a failure based on the results of the check of S2201 (S2202). In the case of no failure (S2202: Yes), the application is staticized via the application management program 3103 (S2206), the backup pair is specified (S2207), a local backup instruction for the backup pair acquired in S2207 is sent to the control program 1121 of the storage system 1a (S2208), and processing ends.

Alternately, in a case where the result of the determination of S2202 is that a failure exists (S2202: Yes), a failure notification is issued to the storage management program 2110 via the failure detection program 3102, and the operation at the time of failure is acquired (S2203).

Next, a determination is made as to whether the operation at the time of failure acquired in S2203 is "suspend" or "continue" (S2204). In the case of "continue" (S2204: No), the same processing as when the result of the determination of S2202 was no failure is carried out, and processing ends.

Alternately, in a case where the result of the determination of S2204 is "suspend" (S2204: Yes), the local backup management table is referenced, and the local backup of the volume being used by the application in which the failure occurred is invalidated. That is, the backup status column of the local backup management table is set to "invalid" (S2205), and processing ends.

Furthermore, in the processing flow of FIG. 22, since the application is staticized after checking whether or not a failure has occurred in the volume targeted for backup, there may be cases in which the failure check data and the actual backup data do not match. In order to prevent this, the failure check may be carried out while the application is in the staticized state.

FIG. 23 is a diagram showing an example of the processing flow of the storage management program 2110 when the storage management program 2110 has received a failure notification from the local backup management program. The storage management program 2110 receives the failure notification from the failure detection program 3102 (S2301).

Next, the storage management program 2110 references the operation-at-failure management table 2109 and acquires the priorities registered in the priority column 21095 for all the entries specified by the volume identifier, the application identifier, and the failure identifier included in the failure notification. Then, the storage management program 2110 acquires the operation at the time of failure registered in the operation-at-failure column 21094 of the entry having the highest priority (S2302), and notifies the local backup management program of the acquired operation at the time of failure (S2303).

Next, a determination is made as to whether the operation at the time of failure acquired in S2303 is "suspend" or "continue" (S2304). In the case of "continue" (S2304: No), processing ends.

Alternately, in a case where the result of the determination in S2304 is "suspend" (S2304: Yes), the storage management program 2110 references the remote backup management table 2104 and invalidates the remote backup for the volume that is being used by the application in which the failure occurred. That is, the backup status column 21044 of the remote backup management table 2104 is set to "invalid" (S2305).

Next, the storage management program 2110 references the operation-at-failure management table 2109 and acquires the identifiers of all the applications using the volume for which the backup is to be suspended (S2306). Next, the storage management program 2110 references the application management table 2102, acquires the IP address of the host computer that is running the application identified by the application identifier acquired in S2305 (S2307), issues an operation change report to the host computer to which this IP address is assigned (S2308) and ends the processing.

Furthermore, in FIGS. 22 and 23, the local backup operation and the remote backup operation at the time of the failure were determined based on the same operation-at-failure management table, but an operation-at-failure management table for a local backup and an operation-at-failure management table for a remote backup may be prepared, and the local backup operation and the remote backup operation at the time of the failure may be determined based the respective tables.

Example 2

This example provides a mechanism, which, when the storage management software receives a failure notification, determines whether the first remote backup subsequent to the failure occurring will be continued or suspended based on the application in which the failure has occurred, the mode of this failure, and the quantity of data that has changed from the time the last remote backup prior to the failure was carried out until the time the first remote backup subsequent to the failure is to be carried out. The following explanation will focus on the points of difference with the first example.

The configurations of the computer system and host computer of this example are the same as the configurations of the computer system 1 and the host computer 30 of the first example, and as such, explanations of these configurations will be omitted.

Figure 24:
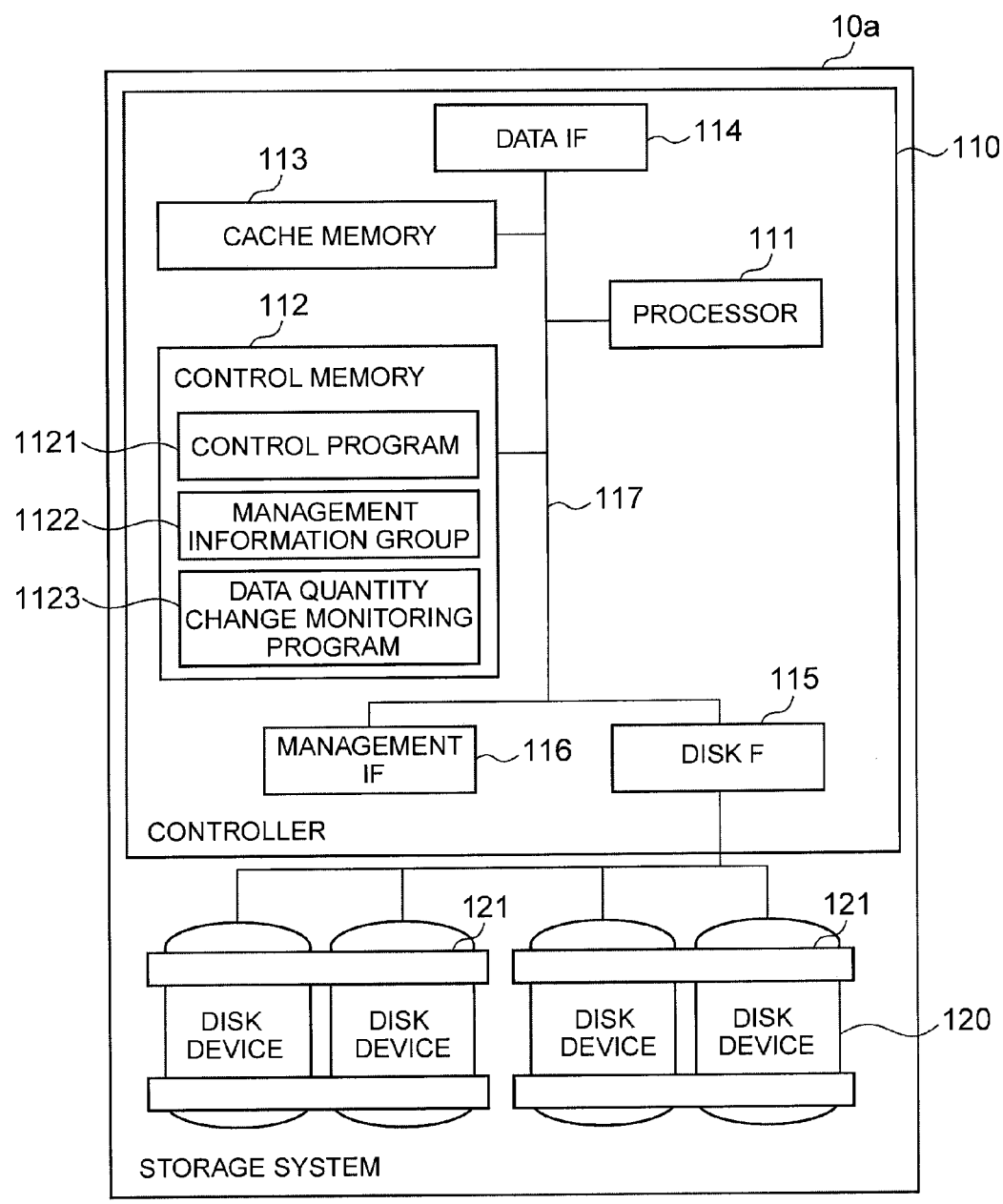
FIG. 24 is a diagram showing the configuration of a storage system in a second example.

FIG. 24 shows an example of the configuration of a storage system 10a of the second example. The point of difference with the first example is that a data quantity change monitoring program 1123 is disposed in the control memory 112. The data quantity change monitoring program 1123 is for monitoring and computing how much data stored in a volume will be changed on the basis of I/O requests from the host computers 30a, 30b. For example, the data quantity change monitoring program 1123 monitors and computes the quantity of data that changes in the block units comprising the volume.

Figure 25:
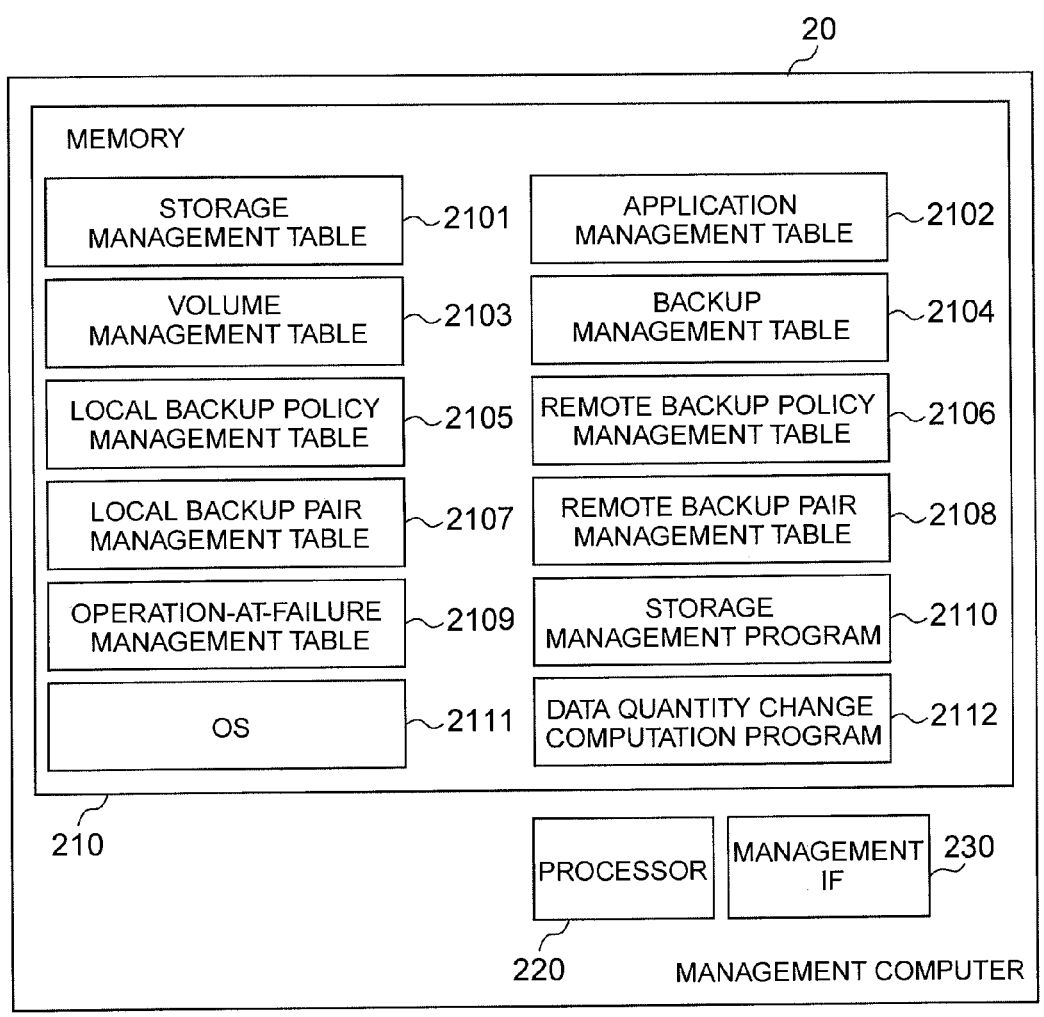
FIG. 25 is a diagram showing the configuration of a management computer in the second example.

FIG. 25 is a diagram showing an example of the configuration of the management computer 20 of the second example. The point of difference with the first example is that a data quantity change computation program 2112 is provided. The data quantity change computation program 2112 is for acquiring the quantity of data that changes in the volume between arbitrary points in time from the data quantity change monitoring program 1123 provided in the storage system 10a.

Furthermore, in this example, the storage system 10a comprises a data quantity change monitoring program, and the quantity of data that changes in the volume is monitored by the storage system 10a, but the data quantity change monitoring program may be disposed in the host computers 30a, 30b, and the quantity of data that changes in the volume may be monitored by the host computer 30a, 30b. In this case, the data quantity change computation program 2112 acquires the quantity of data that has changed from the data quantity change monitoring program disposed in the host computers 30a, 30b. Further, in accordance with this, the quantity of data that changes may be determined from a write quantity rather than being monitored and computed in block units.

FIG. 26 is a diagram showing an example of the operation-at-failure management table 2109 of the second example.

The operation-at-failure management table 2109 defines a remote backup operation when a failure has occurred in an application 3101 running on the host computers 30a, 30b.

Each entry of the operation-at-failure management table 2109 comprises a volume ID column 21091, an application ID column 21092, a failure ID column 21093, a condition column 21094, an operation-at-failure column 21095, and a priority column 21096. Since the columns other than the condition column 21094 are the same as those of FIG. 14, descriptions of these other column will be omitted. A condition for executing the operation at the time of failure (suspend, continue) registered in the operation-at-failure column 21095 is registered in the condition column 21094. Specifically, the extent to which the volume identified by the volume identifier registered in the volume ID column 21091 has changed from the time the last remote backup prior to the failure was carried out until the time the first remote backup subsequent to the failure is to be carried out is defined as the condition.

In the example of FIG. 26, the remote backup continues in a case where the data quantity change from the time the last remote backup prior to the failure was carried out until the time the first remote backup subsequent to the failure is to be carried out is 300K-bytes or more even when the failure F03 (table A destroyed) occurs in the application AP03 the uses the volume VOL02. Alternately, the remote backup does not continue unless the data quantity change from the time the last remote backup prior to the failure was carried out until the time the first remote backup subsequent to the failure is to be carried out is greater than 1000K-bytes in a case where the failure F04 (table B destroyed) occurs in the application AP03.

Furthermore, the user sets the information in the respective columns of the operation-at-failure management table 2109 via the user interface provided by the storage management program 2110.

Figure 27:
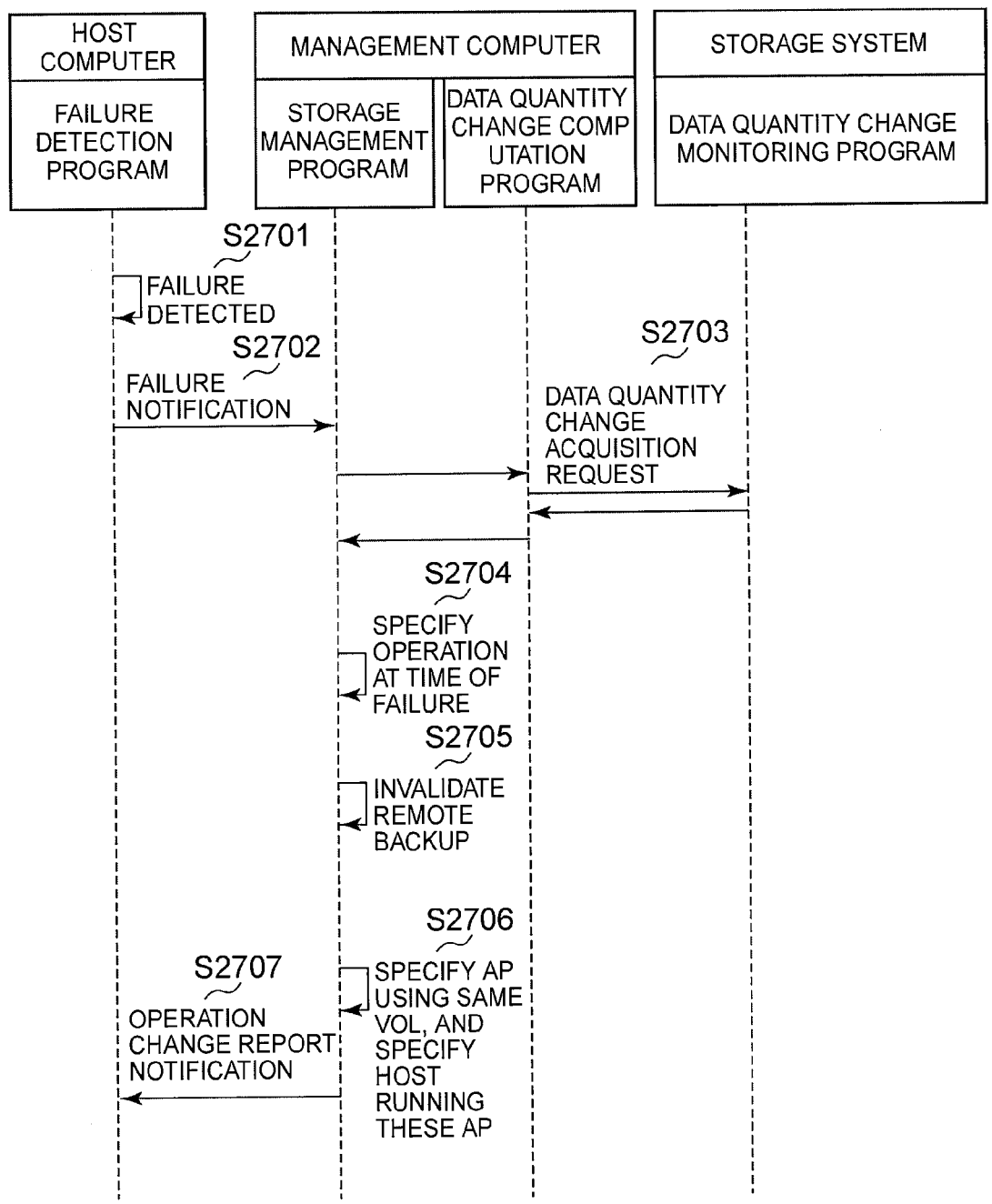
FIG. 27 is a diagram showing the processing sequence in the second example when a failure occurs in the application.

FIG. 27 is a diagram showing an example of the processing sequence in the second example when a logical failure occurs in the application.

The failure detection program 3102, upon detecting a failure (S2701), sends a failure notification to the storage management program 2110 (S2702).

Next, the storage management program 2110 sends a data quantity change acquisition request to the data quantity change monitoring program 1123 via the data quantity change computation program 2112, and receives the data quantity change from the time the last remote backup prior to the failure was carried out until the time the first remote backup subsequent to the failure is to be carried out (S2703). The data quantity change acquisition request comprises the identifier of the volume with respect to which the failure occurred, the time at which the last remote backup prior to the failure was carried out, and the time at which the first remote backup subsequent to the failure is to be carried out.

Next, the storage management program 2110 references the operation-at-failure management table 2109 and acquires the priorities registered in the priority column 21096 for all the entries specified by the volume identifier, the application identifier, and the failure identifier included in the failure notification, and the data quantity change received from the data quantity change monitoring program. Then, the storage management program 2110 acquires the operation at the time of failure registered in the operation-at-failure column 21095 of the entry having the highest priority (S2704). In a case where the acquired operation at the time of failure is "suspend", the storage management program 2110 references the backup management table 2104 and invalidates the remote backup of the volume being used by the application in which the failure occurred. That is, the backup status column 21044 of the backup management table 2104 is set to "invalid" (S2705). In a case where the acquired operation at the time of failure is "continue", the storage management program 2110 sends a backup instruction for a pre-set pair to the control program 1121 based on a pre-set schedule.

Next, in a case where the backup has been suspended, the storage management program 2110 acquires the identifiers of all the applications using the volume for which the backup has been suspended, references the application management table 2102, and specifies the host computer that is running the applications (S2706). Then, the storage management program 2110 issues an operation change report to the specified host computer (S2707).

Figure 28:
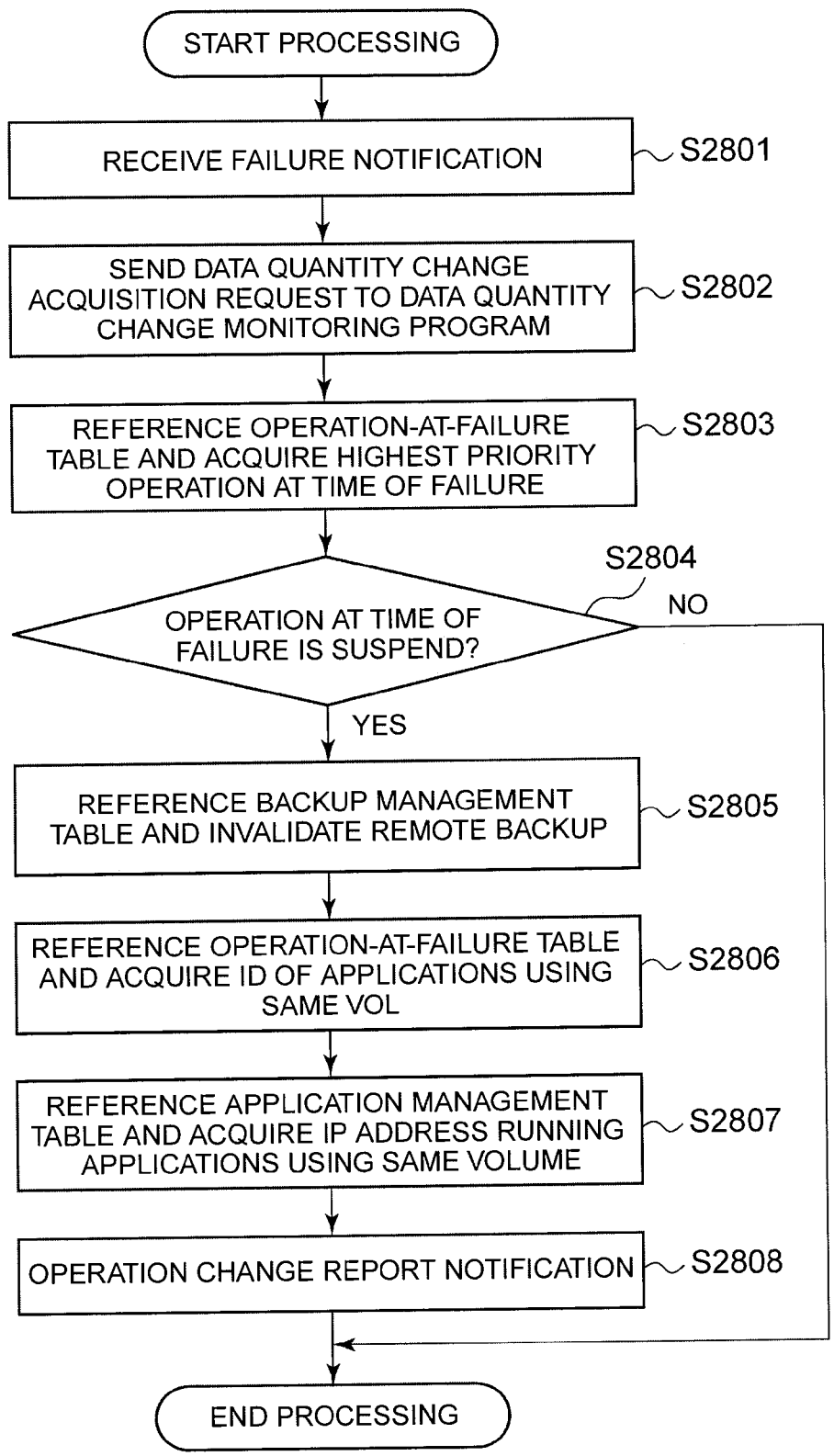
FIG. 28 is a diagram showing the processing flow of the storage management program of the second example when a failure occurs in the application.

FIG. 28 illustrates the processing flows of the storage management program 2110 and the data quantity change computation program 2112 of the second example when a logical failure occurs in the application.

The storage management program 2110 receives the failure notification from the failure detection program 3102 (S2801).

Next, the storage management program 2110 sends a data quantity change acquisition request to the data quantity change monitoring program 1123 via the data quantity change computation program 2112, and receives the data quantity change from the time the last remote backup prior to the failure was carried out until the time the first remote backup subsequent to the failure is to be carried out (S2802).

Next, the storage management program 2110 references the operation-at-failure management table 2109 and acquires the priorities registered in the priority column 21096 for all the entries specified by the volume identifier, the application identifier, and the failure identifier included in the failure notification, and the data quantity change received from the data quantity change monitoring program. Then, the storage management program 2110 acquires the operation at the time of failure registered in the operation-at-failure column 21095 of the entry having the highest priority (S2803).

Next, the storage management program 2110 determines whether the acquired operation at the time of failure is "suspend" or "continue" (S2804). In the case of "continue" (S2804: No), the storage management program 2110 ends the processing. Furthermore, in accordance with this, the storage management program 2110 sends a remote backup instruction to the control program 1121 based on a pre-set schedule.

In a case where the result of the determination of S2804 is "suspend" (S2804: Yes), the storage management program 2110 references the backup management table 2104 and invalidates the remote backup of the volume being used by the application in which the failure has occurred. That is, the storage management program 2110 sets the backup status column 21044 of the backup management table 2104 to "invalid" (S2805).

Next, the storage management program 2110 references the operation-at-failure management table 2109 and acquires the identifier of the application that is using the volume with respect to which the backup has been suspended (S2806). Next, the storage management program 2110 references the application management table 2102, acquires the IP address of the host computer which is running the application that is identified by the identifier of the application acquired in S2806 (S2807), issues an operation change report to the host computer assigned this IP address (S2808), and ends the processing.

In the above-described example, the storage management program comprises a data quantity change computation program, and upon receiving a failure notification, the storage management program computes the data quantity change from the time the last remote backup prior to the failure was carried out until the time the first remote backup subsequent to the failure is to be carried out, and determines whether to suspend or continue the remote backup based on the result of this computation. In accordance with this, it is possible to determine the suspension or continuation of a backup based on the application in which the failure has occurred, the failure mode, and the application operation information.

Example 3

This example provides a mechanism via which, upon receiving a failure notification, the storage management program determines the continuation, suspension, or backup to a temporary volume of the first remote backup subsequent to the failure having occurred. Backup to a temporary volume refers to a backup to a volume that differs from the volume that is set as the backup destination at normal times (when a failure does not occur). The following explanation will focus on those points that differ from the first example.

The configurations of the computer system, the storage system, the management computer and the host computer of this example are the same as the configurations of the computer system 1, storage system 10, management computer 20 and host computer 30 of the first example, and as such explanations of these configurations will be omitted.

FIG. 29 is a diagram showing an example of the operation-at-failure management table 2109 of the third example. The operation-at-failure management table 2109 defines the operation of a remote backup when a failure has occurred in the application 3101 running on the host computer 30a, 30b.

Each entry of the operation-at-failure management table 2109 comprises a volume ID column 21091, an application ID column 21092, a failure ID column 21093, an operation-at-failure column 21094, and a priority column 21095. Since the columns other than the operation-at-failure column 21094 are the same as those of FIG. 14, descriptions of these other column will be omitted. The remote backup operation at the time of the failure identified by the identifiers registered in the application ID column 21092 and the failure ID column 21093 is registered in the operation-at-failure column 21094. In this example, "temporary volume backup" may be registered in addition to "continue" and "suspend". In a case where "temporary volume backup" is registered as the operation at the time of failure, the backup is carried out to a volume that differs from the volume that is set as the backup destination at normal times. That is, it is possible to save the data backed up previously even after a new backup has been executed.

In the example of FIG. 29, in a case where the failure F04 (staticization failed) occurs in the application AP03 that is using the volume VOL03, the data is backed up to a volume that differs from the volume set as the backup destination at normal times.

Furthermore, the user sets the information in the respective columns of the operation-at-failure management table 2109 via the user interface provided by the storage management program 2110.

Figure 30:
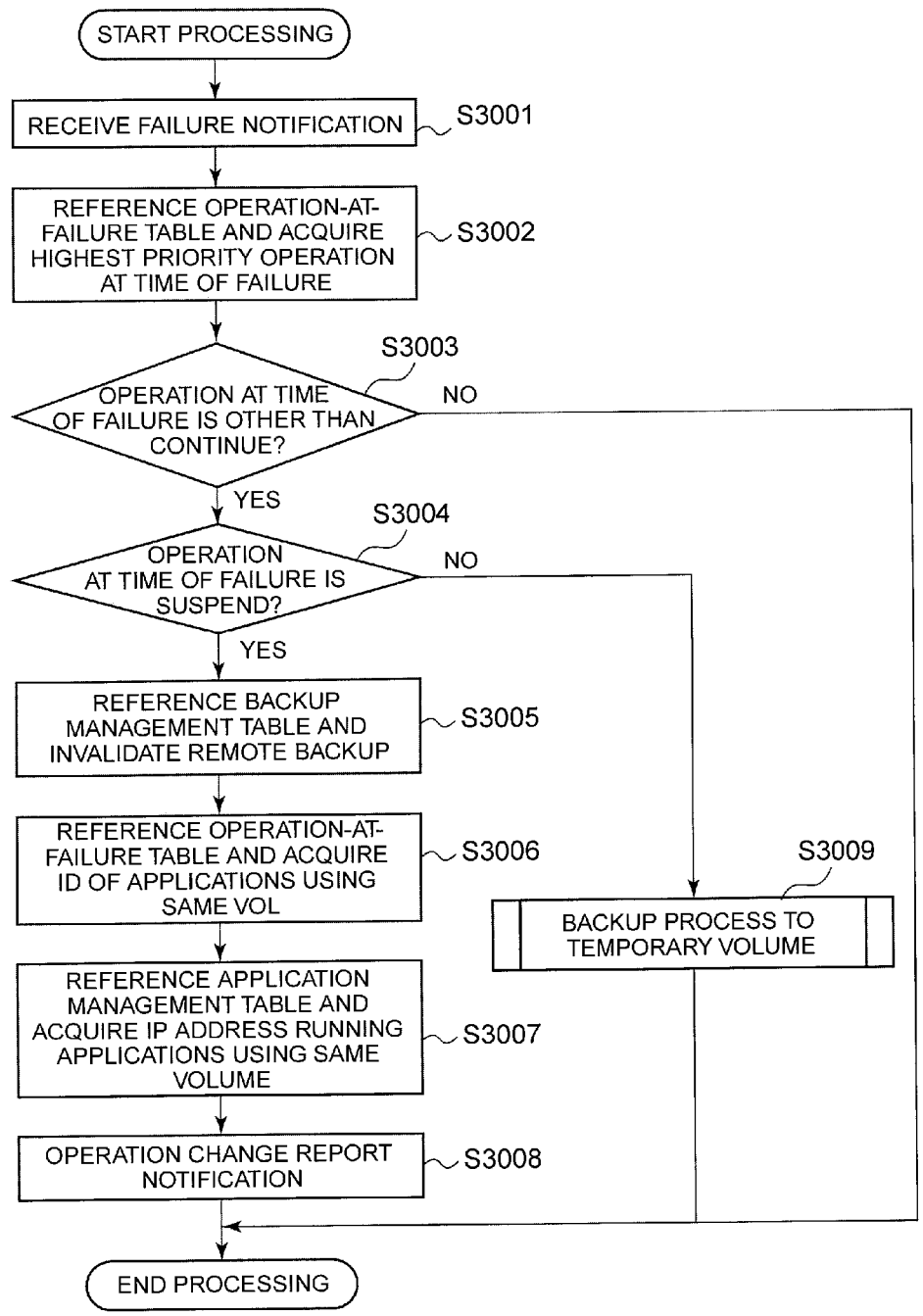
FIG. 30 is a diagram showing the processing flow of the storage management program of the third example when a failure occurs in the application.

FIG. 30 is a diagram showing an example of the processing flow of the storage management program 2110 of the third example when a failure has occurred in the application.

The storage management program 2110 receives a failure notification from the failure detection program 3102 (S3001).

Next, the storage management program 2110 references the operation-at-failure management table 2109 and acquires the priorities registered in the priority column 21095 for all the entries specified by the volume identifier, the application identifier, and the failure identifier included in the failure notification. Then, the storage management program 2110 acquires the operation at the time of failure registered in the operation-at-failure column 21094 of the entry having the highest priority (S3002).

Next, the storage management program 2110 determines whether the acquired operation at the time of failure is "continue" or "other" (either suspend or temporary volume backup) (S3003). In the case of "continue" (S3003: No), the storage management program 2110 ends the processing. Furthermore, in accordance with this, the storage management program 2110 issues a remote backup instruction to the control program 1121 based on a pre-set schedule.

In a case where the result of the determination of S3003 is "other" (S3003: Yes), the storage management program 2110 next determines whether the acquired operation at the time of failure is "suspend" or "temporary volume backup" (S3004). In the case of "temporary volume backup" (S3004: No), the storage management program 2110 executes a backup process to a temporary volume (S3009), and ends the processing. Furthermore, backup processing to a temporary volume will be explained using FIG. 31.

In a case where the result of the determination of S3004 is "suspend" (S3004: Yes), the storage management program 2110 references the backup management table 2104 and invalidates the remote backup to the volume being used by the application in which the failure occurred. That is, the backup status column 21044 of the backup management table 2104 is set to "invalid" (S3005).

Next, the storage management program 2110 references the operation-at-failure management table 2109 and acquires the identifier of the application that is using the volume for which the backup has been suspended (S3006). Next, the storage management program 2110 references the application management table 2102, acquires the IP address of the host computer that is running the application identified by the application identifier acquired in S3006 (S3007), issues an operation change report to the host computer that has been assigned this IP address (S3008), and ends the processing.

Figure 31:
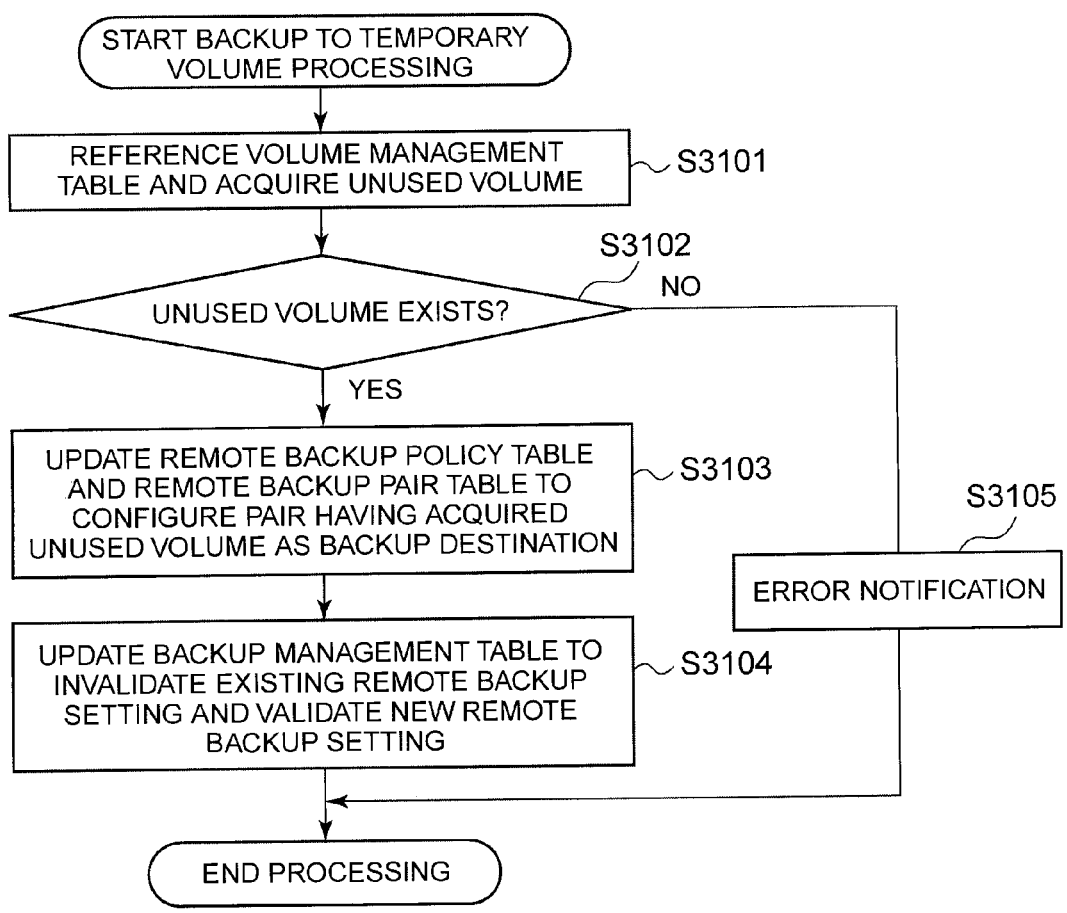
FIG. 31 is a diagram showing the processing flow of the storage management program related to a temporary volume backup process of the storage management program of the third example.

FIG. 31 is a diagram showing an example of the processing flow of the temporary volume backup of the storage management program 2110 of the third example.

The storage management program 2110 references the volume management table 2103 and acquires a temporary volume to serve as the backup destination from among the volumes that are disposed in the storage system 2 of the remote side and marked "unused" in the utilization flag column 21034 (S3101).

In a case where an unused volume does not exist (S3102: No), the storage management program 2110 notifies the local backup management program 3110 (S3105) of an error and ends the processing. Furthermore, the user may define beforehand the remote backup operation in a case where an unused volume does not exist, and the remote backup may be carried out based on this setting.

In a case where the result of the determination of S3102 is "Yes" (S3102: Yes), the storage management program 2110 constructs a volume pair that has the volume acquired in S3101 as the remote backup destination. That is, the storage management program 2110 registers a new backup pair in the remote backup pair management table 2108, and registers a new policy in the remote backup policy management table 2106 (S3103). A schedule set at policy registration is the same schedule as that of the original remote backup policy that has already been registered.

Next, the storage management program 2110 references the backup management table 2104, invalidates the remote backup of the volume that is being used by the application in which the failure occurred, adds (S3104) a new entry so as to carry out a remote backup based on the policy newly created in S3103, and ends the processing. The remote backup thereafter is executed in accordance with the new policy for a volume that differs from the volume set as the backup destination at normal times.

Furthermore, the storage management program 2110 may provide a function for receiving a successful restore notification denoting that the failure restore succeeded and the data backed up locally returned to normal, and upon receiving this successful restore notification, may return the backup pair to its original state. In the above-described example, the storage management program comprises a program for determining a backup to a temporary volume, making it possible to decide a backup suspension, continuation, or temporary volume backup based on the application in which the failure occurred and the failure mode thereof.

What is claimed is:

1. A management which is coupled to a host computer that has an application and a storage system that has a disk device providing a volume used by the application and carries out a backup to the volume, comprising:
   a memory; and
   a CPU that executes a program in the memory,
   wherein the memory comprising:
   operation-at-failure management information; and
   a storage management program,
   wherein the operation-at-failure management information being information that associates an operation at the time of failure denoting the backup operation with an application identifier, an identifier of the type of failure that has occurred in the application, and the failure type, and
   wherein the CPU executing the storage management program, in a case where there is a failure in the application, receives from the host computer a failure notification that includes the identifier of the failed application and the failure type,
   wherein the CPU executing the storage management program refers the failure notification and the operation-at-failure management information and deciding the operation at the time of failure for the application in which the failure has occurred, and
   wherein the CPU executing the storage management program sends to the storage system a command to execute the decided operation at the time of failure.

2. The management computer according to claim 1,
   wherein the operation-at-failure management information includes, with respect to the operation by a failure type, a priority which is a value that denotes a degree of priority corresponding to the failure that has occurred in the application, and
   wherein the CPU executing the storage management program references the operation-at-failure management information when deciding the operation at the time of the failure, and deciding the operation with the highest priority as the operation at the time of failure.

3. The management computer according to claim 2,
   wherein, in a case where a plurality of failures have occurred in the application, wherein the CPU executing the storage management program sends to the storage system a command for suspending the backup as the operation at the time of failure in a case where the priorities of the plurality of failures exceed a predetermined value.

4. The management computer according to claim 1, wherein, in a case where the CPU executing the storage management program has received a notification from the storage system that the volume to be used by the application, in which the failure has occurred, has been restored after sending the storage system a command to suspend backup as the decided operation at the time of failure, the CPU executing the storage management program sends the storage system a command to execute the backup of the volume to be used by the application in which the failure has occurred.

5. The management computer according to claim 1, wherein the failure type includes virus detection, virus infection, table destruction, and staticization failure.

6. The management computer according to claim 5,
   Wherein the backup management information further comprises an identifier of the volume to be used by the application, and wherein, in a case where the failure of the application, in which the failure has occurred, is related to a virus infection,
wherein the failure notification comprises the identifier of the volume that is affected by this virus infection, and
wherein the CPU executing the storage management program references the failure notification and the backup management table and decides the operation at the time of failure for a volume other than the volume, which is affected by the virus infection, and which is used by the application in which the failure has occurred.

7. The management computer according to claim 6,
wherein the operation-at-failure management information further comprises a condition denoting a change in data quantity,
wherein, in a case where the failure type of the operation-at-failure management information is table destruction, the operation-at-failure management information comprises the operation at the time of failure associated with each of the conditions, and
the failure notification further comprises the change in data quantity from the last backup before the occurrence of the failure in the application until the first backup after the occurrence of the failure.

8. The management computer according to claim 1,
wherein the memory further comprises backup management information and pair management information,
wherein the backup management information comprises a backup status denoting the application identifier, the identifier of a pair specifying the backup pair, and whether or not the volume to be used by the application is to be backed up,
wherein the pair management information comprises the storage system identifier, the pair identifier, the backup-source volume identifier, and the backup-destination volume identifier, for the backup to be carried out by the storage system, and
wherein the CPU executing the storage management program references the backup management information and the pair management information when sending to the storage system a command to execute the decided operation at the time of failure.

9. The management computer according to claim 8,
wherein there are a plurality of storage systems connected to the management computer, and
wherein the backup management information further comprises a backup type denoting whether the type of backup to be carried out by the storage system is a local backup or a remote backup.

10. The management computer according to claim 9, wherein the backup management information comprises a first entry in which the backup type is the local backup, and a second entry in which a backup-source identifier is the same as a backup-destination identifier of the first entry, and the backup type is the local backup.

11. The management computer according to claim 9, wherein the backup management information comprises an entry in which the backup type is the remote backup, and does not comprise an entry in which the backup type is the local backup.

12. The management computer according to claim 8, wherein the operation at the time of failure includes backup continuation, suspension, and a temporary volume backup for carrying out a backup to a backup destination that differs from the backup destination in the pair management information.

13. The management computer according to claim 3, wherein the CPU executing the storage management program, after sending to the storage system a command to execute the decided operation at the time of failure, sends to the host computer a notification of command contents.

14. The management computer according to claim 13, wherein the command contents about which the host computer is notified comprises the identifier of the volume for which the backup type has been changed.

* * * * *